(12) United States Patent
Nogi

(10) Patent No.: US 6,443,625 B1
(45) Date of Patent: Sep. 3, 2002

(54) ROLLER BEARING CAGE

(75) Inventor: Takashi Nogi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/582,472

(22) PCT Filed: Oct. 29, 1999

(86) PCT No.: PCT/JP99/06050
§ 371 (c)(1),
(2), (4) Date: Jun. 27, 2000

(87) PCT Pub. No.: WO00/26551
PCT Pub. Date: May 11, 2000

(30) Foreign Application Priority Data

Oct. 30, 1998 (JP) .......................... 10-310995
May 13, 1999 (JP) .......................... 11-132526

(51) Int. Cl.$^7$ .............................. F16C 33/46
(52) U.S. Cl. ................................... 384/572
(58) Field of Search ............... 384/531, 532, 384/523, 575, 572

(56) References Cited

U.S. PATENT DOCUMENTS

| 2,044,663 A | 6/1936 | Brodin |
| 3,253,869 A | 5/1966 | Smith |
| 4,881,830 A | 11/1989 | Shepard et al. |
| 5,062,719 A | 11/1991 | Bauer et al. ................. 384/450 |
| 5,178,474 A | 1/1993 | Müntnich et al. ........... 384/577 |
| 5,547,432 A | 8/1996 | Imanishi et al. |

FOREIGN PATENT DOCUMENTS

| DE | 24 54 442 | 12/1975 |
| DE | 37 18 693 A1 | 12/1988 |
| DE | 4001882 C2 | 1/1990 |
| DE | 39 36 451 A1 | 5/1991 |
| FR | 1188894 | 9/1959 |
| JP | 2-203019 | 8/1990 |
| JP | 7-208569 | 8/1995 |
| JP | 9-177794 | 7/1997 |

Primary Examiner—Lenard A. Footland
(74) Attorney, Agent, or Firm—Crowell & Moring LLP

(57) ABSTRACT

A cage for use in a roller bearing having a plurality of bar portions arranged circumferentially and a pair of circular portions connecting both axial ends of the plurality of bar portions. A circular portion having a larger or equal diameter, in the pair of the circular portions, is referred to as a circular portion, the other of them is referred to as a second circular portion, and it is designed to provide, for example, such a relation as: $0.8 \leq (I_1/I_2) \leq 1.4$, and $0.1 \leq (I_1/I_3) \leq 3.0$ in which the moment of inertia of area for the circular portion is $I_1$, the moment of inertia of area for the second circular portion is $I_2$, and the moment of inertia of area for the bar portion 7 is $I_3$. This enables to improve the strength of the cage without lowering the load capacity of the bearing to which the cage is assembled.

21 Claims, 23 Drawing Sheets

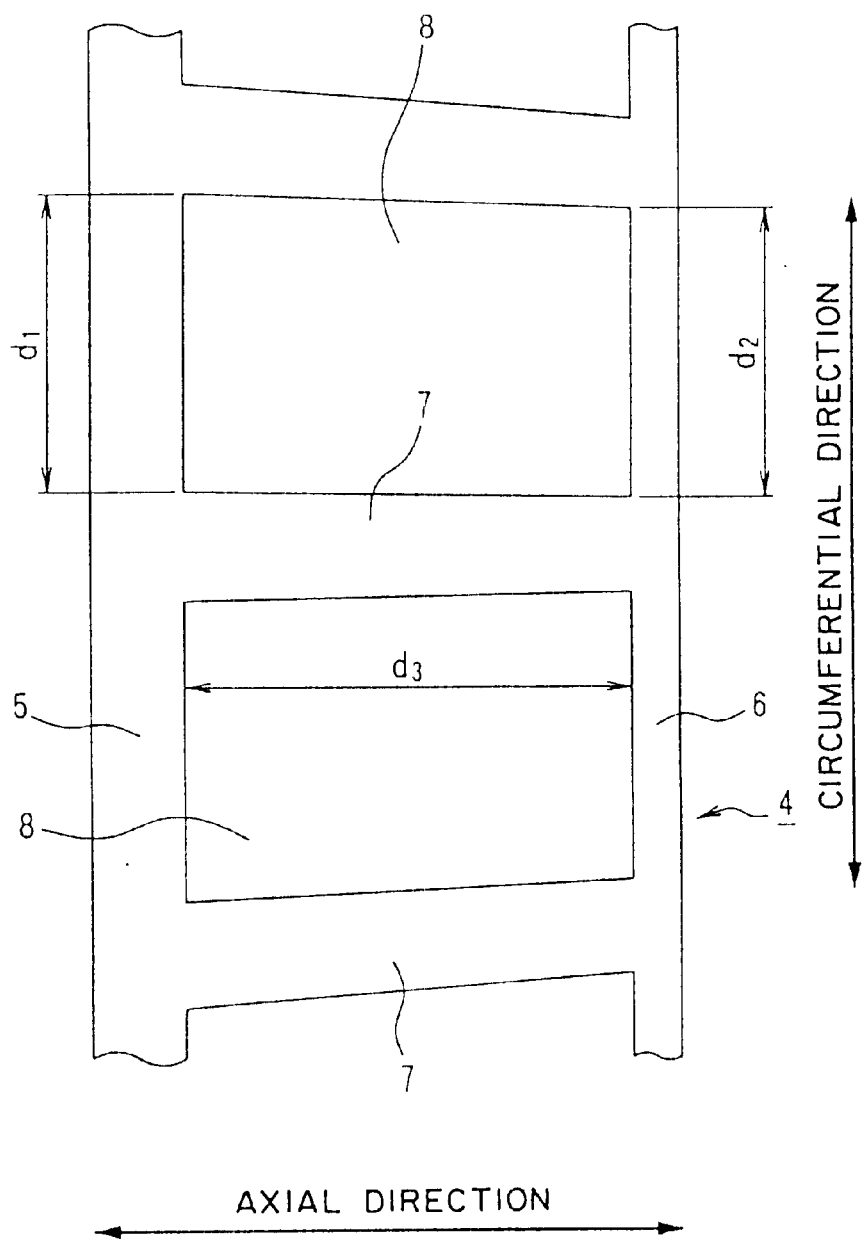

ROLLER BEARING CAGE

TECHNICAL FIELD

The present invention relates to a roller bearing used in places where abrupt acceleration/deceleration or load fluctuations are repeated such as in mill speed reducer used for various types of iron making rolling mills or a roller bearing for use in apparatus causing large vibrations such as axles of railway vehicles or vibrating screens, that is, it relates to a roller bearing for use in places where change of rotational speed of rollers occurs repeatedly or bearing radial vibrations are exerted repeatedly and, more in particular, it relates to a cage assembled in such a roller bearing.

BACKGROUND ART

Roller bearings have been used generally for supporting rotational shafts, for example, in various industrial machines such as iron making rolling mills or vehicles. A roller bearing comprises, for example, as shown in FIG. 1, an outer ring 1 having an outer ring raceway 1a at the inner circumferential surface, an inner ring 2 having an inner ring raceway 2a at the outer circumferential surface, a plurality of rollers 3 assembled such that they can roll between the outer ring raceway 1a and the inner ring raceway 2a, and a cage 4 interposed rotatably between the outer ring raceway 1a and the inner ring raceway 2a in a state of holding the plurality of the rollers 3.

The cage 4 comprises, as shown in FIG. 1 and FIG. 2, bar portions 7 each disposed between each of adjacent pockets 8 and opposed to the rolling surface of the roller, and a pair of circular portions 5, 6 connecting both axial sides of the bar portions 7 and axially opposed to the end surface of the roller.

A space surrounded with the pair of the circular portions 5, 6 and the bar portions 7, 7 is referred to as a pocket 8 for accommodating the roller 3, and the roller 3 is held rotatably in the cage 4 by providing a predetermined gap between the cage 4 and the roller 3.

In the subsequent description, for a cage in which the diameter is different between the pair of the circular portions 5, 6 as in a tapered roller bearing or a self aligning roller bearing, the circular portion of the cage having a larger diameter (larger diameter side) is referred to as a circular portion 5, while the circular portion thereof having a smaller diameter (smaller diameter side) is referred to as a second circular portion 6. Further, when the diameter is equal or nearly equal between the pair of the circular portions 5 and 6 as in a cylindrical roller bearing, the circular portion 5 and the second circular portion 6 are optionally specified.

Further, as shown in FIG. 14, roller bearings for use in various types of industrial machines described above include those having a plurality of rollers 3 arranged in two rows between the outer ring raceway 1a and the inner ring raceway 2a and having two cages 4 individually holding rollers 3 in each of the rows and disposed rotatably between the outer ring raceway 1a and the inner ring raceway 2a.

The cage 4 is a comb-shaped cage, as shown in FIG. 14 and FIG. 15, respectively, comprising a circular portion 5 axially opposed to the end surface of the roller, and a plurality of bar portions 7 protruding from one axial side of the circular portion 5 and arranged circumferentially being opposed to the rolling surface of the roller. Also in this cage, a space surrounded by the circular portion 5 and the bar portions 7, 7 is referred to as a pocket 8 for accommodating the roller 3, and the roller 3 is held rotatably in the cage 4 by providing a predetermined gap between the cage 4 and the roller 3.

In the roller bearing having the two rows of rollers 3 as described above, when individual cage 4 is assembled on every row for each of the rollers 3 as shown in FIG. 14, a comb-shaped cage, a configuration thereof in which the bar portions 7 protrude only from one axial side of the circular portion 5 as shown in FIG. 15 is used. On the other hand, in a case where the rollers 3 in two rows are held by one cage, a comb-shaped cage, a configuration thereof in which bar portions 7 protrude respectively from both axial sides of the circular portion 5 as shown in FIG. 16 is used.

In the subsequent description, a comb-shaped cage of a configuration in which bar portions 7 protrude from one axial side of the circular portion 5 as shown in FIG. 15 is sometimes also referred to as a two component type cage, whereas a comb-shaped cage of a configuration in which bar portions 7 protrude from both axial sides of the circular portion 5 as shown in FIG. 16 is sometimes also referred to as a one component type cage.

By the way, when the roller bearing having each of the cages 4 as described above is used in places where abrupt acceleration/deceleration or load fluctuations are repeated such as in mill speed reducer used for various types of iron making rolling mills, since rotational speed of the rollers 3 changes abruptly, the roller 3 collides against the bar portion 7 of the cage 4 again and again. A load W in the circumferential direction by the collision is applied from the roller 3 to the bar portion 7 of the cage 4 as shown in FIG. 3 and FIG. 17 to deform the cage 4.

As a result, since the bending stress is loaded on the circular portions 5, 6 and the bar portion 7 repeatedly, cracks occur in the circular portions 5, 6 or the bar portions 7 which not only fractures the cage 4 but also sometimes makes the rotation of the bearing impossible during long time use.

Since the cracks occur at a connection section between the circular portions 5, 6 and the bar portions 7, it is necessary for preventing fracture of the cage 4 thereby preventing deterioration for the bearing life, to moderate the bending stress caused to the connection section by the load W in the circumferential direction.

Now, in a cage of a type having a pair of circular portions 5, 6 as shown in FIG. 1 and FIG. 2, the load W from the roller 3 exerts moment $M_1$, $M_2$ to each connection section between the circular portion 5 and the second circular portion 6, and the bar portions 7 respectively. Let the bending stress caused to an area A of the circular portion 5 in the connection section between the circular portion 5 and the bar portion 7 be denoted by $\sigma_1$, the bending stress caused to an area B of the second circular portion 6 in the connection section between the second circular portion 6 and the bar portion 7 be denoted by ($\sigma_2$, a bending stress caused to an area c of the bar portion 7 at the connection section between the circular portion 5 and the bar portion 7 be denoted by $\sigma_3$ and the bending stress caused to an area D of the bar portion 7 at the connection section between the second circular portion 6 and the bar portion 7 be denoted by $\sigma_4$, bending stresses $\sigma_1$ to a $\sigma_4$ are expressed by the following equations based on the conditions for the balance of forces in view of the strength of materials:

$$\sigma_1 = M_1 e_1/(2I_1) \tag{1}$$

$$\sigma_2 = M_2 e_2/(2I_2) \tag{2}$$

$$\sigma_3 = M_1 e_3/I_3 \tag{3}$$

$$\sigma_4 = M_2 e_3/I_3 \tag{4}$$

$I_1$, $I_2$ and $I_3$ denote, respectively, moment of inertia of area for the circular portion 5, the second circular portion 6 and the bar portions 7, and moment of inertia of area $I_1$, $I_2$ and $I_3$ are defined by the following equations:

$$I_1 = \int_{A_1} z_1^2 dA_1 \quad (5)$$

$$I_2 = \int_{A_2} z_2^2 dA_2 \quad (6)$$

$$I_3 = \int_{A_3} z_3^2 dA_3 \quad (7)$$

$A_1$, $A_2$ and $A_3$ in the equations (5) to (7) described above denote, respectively, the cross sectional areas for the circular portion 5, the second circular portion 6 and the bar portion 7.

Further, $e_1$ to $e_3$ in the equations (1) to (3) described above denote the maximum distances from the center of the graph to the cross sectional circumferential edge in each of the coordinate systems to be described later.

Further, the coordinate system for each of the moment of inertia of area $I_1$, $I_2$ and $I_3$ is defined as follows. That is, as shown in FIG. 1, the moment of inertia of area $I_1$ is in accordance with a $y_1$-$z_1$ orthogonal coordinate system, on the cross section of the circular portion 5, taking an axis $y_1$ in the direction of a normal line for the conical surface or cylindrical surface that defines the outer diametrical surface of the cage and taking an axis $z_1$ axially and in the direction of a tangential line for the conical surface or cylindrical surface, with respect to the center of the graph for the cross section as an origin, and this is a moment of inertia of area relative to a neutral axis vertical to the longitudinal direction of the bar portion 7. Further, the moment of inertia of area $I_2$ is in accordance with a $y_2$-$z_2$ orthogonal coordinate system, on the cross section of the second circular portion 6, taking an axis $y_2$ in the direction of a normal line for the conical surface or cylindrical surface and taking an axis $z_2$ axially and in the direction of a tangential line for the conical surface or cylindrical surface, with respect to the center of the graph for the cross section as an origin, and this is a moment of inertia of area relative to a neutral axis vertical to the longitudinal direction of the bar portion 7. Further, the moment of inertia of area $I_3$ is in accordance with a $y_3$-$z_3$ orthogonal coordinate system, on the cross section of the bar portion 7, taking an axis $y_3$ in the direction of a normal line for the conical surface or cylindrical surface and taking an axis $z_3$ circumferentially and in the direction of a tangential line for the conical surface or cylindrical surface, with respect to the center of the graph for the cross section as an origin, and this is a moment of inertia of area relative to a neutral axis vertical to the circumferential direction of the cage 4.

The longitudinal direction of the bar portion 7 means herein substantially the axial direction of the bearing.

Then, $e_1$ in the equation (1) above represents the maximum value in the $z_1$ coordinate at the cross sectional circumferential edge of the circular portion 5 on the side of the bar portion. Further, $e_2$ in the equation (2) above represents the maximum value of the absolute value in the $z_2$ coordinate at the cross sectional circumferential edge of the second circular portion 6 on the side of the bar portion. Further, $e_3$ in the equation (3) above represents the maximum value of the absolute value in the $z_3$ coordinate at the cross sectional circumferential edge of the bar portion 7.

Further, in the case of the cage as shown in FIG. 1 and FIG. 2 above, where the cross sectional shape of the bar portion 7 does not change in the axial direction, since the moment of inertia of area for the bar portion 7 does not also change in the axial direction, $I_3$ is defined as the value of the moment of inertia of area. However, in a case where the cross sectional shape of the bar portion 7 changes in the axial direction, the moment of inertia of area of the bar portion 7 also changes in the axial direction. In this case, $I_3$ in the tapered roller bearing is defined as an average value for the moment of inertia of area at one end of the bar portion 7 and the moment of inertia of area at the other end of the bar portion 7. Further, $I_3$ in the cylindrical roller bearing and the self-aligning roller bearing is defined as an average value for the moment of inertia of area at one end of the bar portion 7, the moment of inertia of area at the other end of the bar portion 7 and the moment of inertia of area in the axial center of the bar portion 7.

Further, in the comb-shaped cage as shown in FIG. 14 and FIG. 15, moment M is exerted on a connection section between the circular portion 5 and bar portion 7 as shown in FIG. 17 by the load W in the circumferential direction caused by the collision of the roller 3. Let the bending stress caused to the area A of the circular portion 5 in the connection section between the circular portion 5 and the bar portion 7 be denoted by $\sigma_1$ and the bending stress caused to the area C of the bar portion 7 in the connection section between the circular portion 5 and the bar portion 7 be denoted by $\sigma_3$, each of the bending stresses $\sigma_1$ and $\sigma_3$ is represented by the following equation based on the conditions for the balance of forces in view of the strength of materials:

$$\sigma_1 = Me_1/(2I_1) \quad (8)$$

$$\sigma_3 = Me_3/I_3 \quad (9)$$

$I_1$ and $I_3$ described above are, respectively, the moment of inertia of area for the circular portion 5 and the bar portion 7, and the moment of inertia of area $I_1$ and $I_3$ are defined by the following equations:

$$I_1 = \int_{A_1} z_1^2 dA_1 \quad (10)$$

$$I_3 = \int_{A_1} z_3^2 dA_3 \quad (11)$$

$A_1$ and $A_3$ in the equations (10) and (11) represent cross sectional areas for the circular portion 5 and the bar portion 7 respectively. Further, $e_1$ and $e_3$ in the equations (8), (9) above represent maximum distances from the center of the graph to the cross sectional circumferential edge in each of the coordinate systems to be described later.

Further, in the same manner as described above, coordinate system for each of the moment of inertia of area $I_1$, $I_2$ and $I_3$ is defined as below. That is, as shown in FIG. 14, the moment of inertia of area $I_1$ is in accordance with a $y_1$-$z_1$ orthogonal coordinate system, on the cross section of the circular portion 5, taking an axis $y_1$ in the direction of a normal line for the cylindrical surface that defines the outer diametrical surface of the cage and taking an axis $z_1$ axially and in the direction of a tangential line for the cylindrical surface, with respect to the center of the graph for the cross section as an origin, and this is a moment of inertia of area relative to a neutral axis vertical to the longitudinal direction of the bar portion 7. Further, as shown in FIG. 14, the moment of inertia of area $I_3$ is in accordance with a $y_3$-$z_3$ orthogonal coordinate system, on the cross section of the bar portion 7, taking an axis $y_3$ in the direction of a normal line for the cylindrical surface and taking an axis $z_3$ circumferentially and in the direction of a tangential line for the cylindrical surface, with respect to the center of the graph for the cross section as an origin, and this is a moment of inertia of area relative to a neutral axis vertical to the circumferential direction of the cage.

Further, $e_1$ in the equation (8) above represents the maximum value in the $z_1$ coordinate in the cross sectional circumferential edge of the circular portion 5 on the side of the bar portion. Further, $e_3$ in the equation (9) above represents the maximum value in the $z_3$ coordinate in the cross sectional circumferential edge of the bar portion 7.

In the comb-shaped cage, the cross sectional shape of the bar portion 7 is generally unchanged in the axial direction but the cross sectional shape of the bar portion 7 may sometimes be changed in the axial direction such as, for example, in a cage for use in a self-aligning roller bearing. In such a case, $I_3$ is defined as a moment of inertia of area at a connection section of the bar portion 7 with the circular portion 5.

As can be seen from the equation (1) to equation (4) or equation (8) and equation (9) above, it can be seen that each of the stresses $\sigma_1$ to $\sigma_4$ can be decreased by enlarging all the moment of inertia of area $I_1$, $I_2$ and $I_3$.

On the other hand, in a case where the roller bearing having a cage 4 as shown in FIG. 27 is used in such places as undergoing large vibrations such as axles or driving devices of vehicles, iron making rolling mills or vibrating screens, the cage 4 vibrates repeatedly in the radial direction of the bearing and the bar portion 7 of the cage 4 collides with the roller 3 again and again. The collision exerts a radial load W' (radial direction) from the roller 3 to the bar portion 7 of the cage 4, and the cage 4 deforms as shown in FIG. 26. In this way, when the bending stress is loaded repeatedly to the pair of circular portions 5 and 6 and the bar portions 7, cracks occur in the circular portion 5 and 6 or the bar portions 7 during long time use, which not only fractures the cage 4 but also makes sometimes the bearing impossible to rotate.

Since the cracks occur in the connection section between the circular portions 5 and 6 and the bar portions 7, it is necessary for preventing the fracture of the cage 4 thereby preventing shortening of the bearing life, to moderate the bending stress caused to the connection section by the load W'.

The cage 4 deforms as shown in FIG. 26 by the load W' from the roller 3. That is, the load W' is exerted on the axial center of bar portion 7, and moments $M_1'$ and $M_2'$ is exerted to each of the connection sections between the circular portion 5 and the second circular portion 6, and the bar portions 7 respectively and the bar portion 7 deforms by these loads and these moments as shown in FIG. 26. Further, loads $\kappa W'$ and $(1-\kappa)W'$ is exerted to each of the connection sections between the circular portion 5 and the second circular portion 6, and the bar portions 7, and the circular portions 5 and 6 deform by these loads as shown in FIG. 26. In this case, $\kappa$ is a constant of larger than 0 and smaller than 1, which can be determined by calculation in view of the strength of materials.

Let the bending stress caused to the area A of the circular portion 5 in the connection section between the circular portion 5 and the bar portion 7 be denoted by $\sigma_1'$, the bending stress caused to the area B of the second circular portion 6 in the connection section between the second circular portion 6 and the bar portion 7 be denoted by $\sigma_2'$, the bending stress caused to the area C of the bar portion 7 in the connection section between the circular portion 5 and the bar portion 7 be denoted by $\sigma_3'$, and the ending stress caused to the area D of the bar portion 7 in the connection section between the second circular portion 6 and the bar portion 7 be denoted by $\sigma_4'$, each of the bending stresses $\sigma_1'$ to $\sigma_4'$ can be represented by the following equations, for example, based on the conditions for the balance of forces in view of the strength of materials:

$$\sigma_1' = \kappa W' d_1 e_1' / (4I_1') \quad (12)$$

$$\sigma_2' = (1-\kappa) W' d_2 e_2' / (4I_2') \quad (13)$$

$$\sigma_3' = M_1' e_3'' / I_3' \quad (14)$$

$$\sigma_4' = M_2' e_3'' / I_3' \quad (15)$$

The $I_1'$, $I_2'$ and $I_3'$ represent, respectively, moment of inertia of area for the circular portion 5, the second circular portion 6 and the bar portion 7, and the moment of inertia of area $I_1'$, $I_2'$ and $I_3'$ are defined by the following equations.

$$I_1' = \int_{A1} y_1^2 dA_1 \quad (16)$$

$$I_2' = \int_{A2} y_2^2 dA_2 \quad (17)$$

$$I_3' = \int_{A3} y_3^2 dA_3 \quad (18)$$

$A_1$, $A_2$ and $A_3$ in the equations (16) to (18) described above represent, respectively, the cross sectional areas for the circular portion 5, the second circular portion 6 and the bar portion 7. Further, $e_1'$, $e_2'$ and $e_3'$ in the equations (12) to (15) described above represent the distances from the center of the graph to the cross sectional circumferential edge in each of the coordinate systems to be described later.

Further, the coordinate system for each of the moment of inertia of area $I_1'$, $I_2'$ and $I_3'$ is defined as follows. That is, as shown in FIG. 27, the moment of inertia of area $I_1'$ is in accordance with a $y_1$-$z_1$ orthogonal coordinate system, on the cross section of the circular portion 5, taking an axis Yi in the direction of a normal line for the conical surface or cylindrical surface that defines the outer diametrical surface of the cage and taking an axis $z_1$ axially and in the direction of a tangential line for the conical surface or cylindrical surface, with respect to the center of the graph for the cross section as an origin, and this is a moment of inertia of area relative to a neutral axis parallel with the longitudinal direction of the bar portion 7. Further, the moment of inertia of area $I_2'$ is in accordance with a $y_2$-$z_2$ orthogonal coordinate system, on the cross section of the second circular portion 6, taking an axis $y_2$ in the direction of a normal line for the conical surface or cylindrical surface and taking an axis $z_2$ axially and in the direction of a tangential line for the conical surface or cylindrical surface, with respect to the center of the graph for the cross section as an origin, and this is a moment of inertia of area relative to a neutral axis parallel with the longitudinal direction of the bar portion 7. Further, the moment of inertia of area $I_3'$ is in accordance with a $y_3$-$z_3$ orthogonal coordinate system, on the cross section of the bar portion 7, taking an axis $y_3$ in the direction of a normal line for the conical surface or cylindrical surface and taking an axis $z_3$ circumferentially and in the direction of a tangential line for the conical surface or cylindrical surface, with respect to the center of the graph for the cross section as an origin, and this is a moment of inertia of area relative to a neutral axis parallel with the circumferential direction of the cage.

Then, $e_1'$ in the equation (12) above represents the absolute maximum value in the $y_1$ coordinate at the cross sectional circumferential edge of the circular portion 5. Further, $e_2'$ in the equation (13) above represents the absolute maximum value in the $y_2$ coordinate at the cross sectional circumferential edge of the second circular portion 6. Further, $e_3'$ in the equation (14) above represents the absolute maximum value in the $y_3$ coordinate in the cross sectional circumferential edge of the bar portion 7.

Further, in a case where the cross sectional shape of the bar portion 7 does not change in the axial direction, since the moment of inertia of area for the bar portion 7 does not also change in the axial direction, $I_3'$ is defined with the value for the moment of inertia of area. However, in a case where the cross sectional shape of the bar portion 7 changes in the axial direction, the moment of inertia of area of the bar portion 7 also changes in the axial direction. In this case, $I_3'$ in the tapered roller bearing is defined as an average value for the moment of inertia of area at one end of the bar portion 7 and the moment of inertia of area at the other end of the bar portion 7. Further, $I_3'$ in the cylindrical roller bearing and self-aligning roller bearing is defined as an average value for the moment of inertia of area at one end of the bar portion 7, the moment of inertia of area at the other end of the bar portion 7 and the moment of inertia of area at the axial center of the bar portion 7.

As can be seen from the equation (12) to the equation (15), each of the stresses $\sigma_1'$ to $\sigma_4'$ decreases as all of the moment of inertia of area $I_1'$, $I_2'$ and $I_3'$ increase.

Then, in the prior art, the moment of inertia of area $I_1$, $I_2$ and $I_3$ and $I_1'$, $I_2'$ and $I_3'$ are increased respectively by increasing all of the cross sections for the circular portions 5 and 6 and the bar portions 7, to improve the strength of the cage 4 thereby preventing occurrence of fracture.

In this case, while it was experientially recognized that the cross sectional area may be increased to improve the strength when the strength of the cage is insufficient but it was not designed by considering each of the moment of inertia of area for the circular portions 5 and 6 and the bar portions 7 and optimally determining the strength thereof.

Accordingly, in any type of the cages, when it is designed such that all the moment of inertia of area $I_1$, $I_2$ and $I_3$ or all the moment of inertia of area $I_1'$, $I_2'$ and $I_3'$ for the circular portions 5 and 6 and the bar portions 7 are increased, since the space volume for holding the rollers 3 (size and number of pockets 8) is decreased, the number of the rollers 3 that can be assembled into the bearing is decreased or the size of the roller 3 has to be reduced as the strength of the cage 4 is improved to bring about problem that the load capacity of the bearing is lowered. Further, it results in unnecessary increase of the weight of the cage.

Particularly, when it is intended to increase the strength to the composite load formed by both of the loads, namely, circumferential load and the radial load, all the moment of inertia of area $I_1$, $I_2$ and $I_3$ and the moment of inertia of area $I_1'$, $I_2'$ and $I_3'$ are increased and, as a result, the problem described above becomes conspicuous.

The present invention has been achieved while taking notice of such a problem and it is a object thereof to provide a cage for use in a roller bearing capable of improving the strength of the cage without lowering the load capacity of the bearing to which the cage is assembled.

DISCLOSURE OF THE INVENTION

It has been noted in each of the present inventions that the strength of the cage can be improved without lowering the load capacity of the bearing and preventing increase in the weight of the cage, by optimizing the bending stress of the circular portion and the bending strength of the bar portion such that they are not different greatly from each other while considering the direction of load exerted from the roller.

That is, for solving the foregoing subject, the invention described in claim 1 provides a cage for use in a roller bearing having a plurality of bar portions arranged circumferentially being opposed to the rolling surface of each of rollers and a pair of circular portions axially opposed to the end surface of each of the rollers and connecting both axial ends of the bar portions arranged in the circumferential direction, respectively, which satisfies at least one of the conditional equations;
the conditional equation:

$$0.8 \leq (I_1/I_2) \leq 1.4$$

and $$0.1 \leq (I_1/I_3) \leq 3.0$$

or the conditional equation:

$$0.5 \leq (I_1'/I_2') \leq 2.7$$

and $$0.2 \leq (I_1'/I_3') \leq 6.0$$

where
a circular portion having a larger or identical diameter, in the pair of the circular portions, is referred to as a circular portion, a circular portion having a smaller or identical diameter is referred to as a second circular portion, and it is defined that the moment of inertia of area for the circular portion relative to a neutral axis vertical to the longitudinal direction of the bar portion is $I_1$, the moment of inertia of area for the second circular portion relative to a neutral axis vertical to the longitudinal direction of the bar portion is $I_2$, the moment of inertia of area for the bar portion relative to a neutral axis vertical to the circumferential direction of the cage is $I_3$, the moment of inertia of area for the circular portion relative to a neutral axis parallel with the longitudinal direction of the bar portion is $I_1'$, the moment of inertia of area for the second circular portion relative to a neutral axis parallel with the longitudinal direction of the bar portion is $I_2'$, and the moment of inertia of area for the bar portion relative to a neutral axis parallel with the circumferential direction of the cage is $I_3'$.

As in a case of a cylindrical roller bearing, when the diameter is equal or nearly equal between the pair of the circular portions, a circular portion on optional side may be referred to as the circular portion and the other of them may be referred to as the second circular portion.

As in a cage for use in a roller bearing assembled in a tapered roller bearing, it is preferred as in the invention described in claim 2 to satisfy the conditions:

$$1.0 \leq (I_1/I_2) \leq 1.4$$

and $$0.1 \leq (I_1/I_3) \leq 3.0.$$

Further, in a cage for use in a roller bearing assembled in a self-aligning roller bearing, it is preferred as in the invention described in claim 3 to satisfy the conditions:

$$0.8 \leq (I_1/I_2) \leq 1.2$$

and $$0.3 \leq (I_1/I_3) \leq 3.0.$$

Further, in a case of a cage for use in a roller bearing assembled into a cylindrical roller bearing in which the diameter is equal or nearly equal between the pair of the circular portions, it is preferred as in the invention described in claim 4 to satisfy the condition:

$$0.1 \leq (I_1/I_3) \leq 0.4.$$

Further, in a cage for use in a roller bearing assembled in a tapered roller bearing, it is preferred as in the invention described in claim 5 to satisfy the conditions:

$$1.0 \leq (I_1'/I_2') \leq 2.7$$

and $$0.2 \leq (I_1'/I_3') \leq 6.0.$$

Further, in a cage for use in a roller bearing assembled in a self-aligning roller bearing, it is preferred as in the invention described in claim 6 to satisfy the conditions:

$$0.5 \leq (I_1'/I_2') \leq 1.7$$

and $$0.2 \leq (I_1'/I_3') \leq 4.0.$$

Further, in a cage for use in a roller bearing assembled in a cylindrical roller bearing, it is preferred as in the invention described in claim 7 to satisfy the condition:

$$0.2 \leq (I_1'/I_3') \leq 0.8.$$

Further, in a cage for use in a roller bearing assembled in a tapered roller bearing, it is preferred as in the invention described in claim 8 to satisfy all of the conditions:

$$1.0 \leq (I_1/I_2) \leq 1.4$$

and $$0.1 \leq (I_1/I_3) \leq 3.0,$$

$$1.0 \leq (I_1'/I_2') \leq 2.7$$

and $$0.2 \leq (I_1'/I_3') \leq 6.0.$$

Further, in a cage for use in a roller bearing assembled in a self-aligning roller bearing, it is preferred as in the invention described in claim 9 to satisfy all of the conditions:

$$0.8 \leq (I_1/I_2) \leq 1.2$$

and $$0.3 \leq (I_1/I_3) \leq 3.0$$

$$0.5 \leq (I_1'/I_2') \leq 1.7$$

and $$0.2 \leq (I_1'/I_3') \leq 4.0.$$

Further, in a cage for use in a roller bearing assembled in a cylindrical roller bearing, it is preferred as in the invention described in claim 10 to satisfy both of the conditions:

$$0.1 \leq (I_1/I_3') \leq 0.4$$

and $$0.2 \leq (I_1'/I_3') \leq 0.8.$$

In a case where the roller bearing as an object is a cylindrical roller bearing, it is usually: $(I_1/I_2) \approx 1$ but it is not always necessary to design the value as 1.

Then, the invention described in claim 11 provides a comb-shaped cage for use in a roller bearing having one circular portion axially opposed to the end surface of each of rollers and a plurality of bar portions protruding from one or both axial sides of the circular portion and arranged circumferentially while opposed to the rolling surface for each of the rollers, which satisfies the condition: $0.3 \leq (I_1/I_3) \leq 1.6$, where the moment of inertia of area for the circular portion relative to a neutral axis vertical to the longitudinal direction of the bar portion is $I_1$ and the moment of inertia of area for the bar portion relative to a neutral axis vertical to the circumferential direction of the cage is $I_3$.

In this case, in a cage in which bar portions protrude from only one axial side of the circular portion and which is assembled into a double row cylindrical roller bearing, it is preferred as in the invention described in claim 12 to satisfy the condition: $0.3 \leq (I_1/I_3) \leq 0.9$.

Further, in a cage in which the bar portions protrude from both axial sides of the circular portion and which is assembled into a double row cylindrical roller bearing, it is preferred as in the invention described in claim 13 to satisfy the condition: $0.7 \leq (I_1/I_3) \leq 1.6$.

Further, in a cage in which the bar portions protrude from only one axial side of the circular portion and which is assembled into a self-aligning roller bearing, it is preferred as in the invention described in claim 14 to satisfy the condition: $0.5 \leq (I_1/I_3) \leq 1.5$.

Further, in a cage in which the bar portions protrude from both axial sides of the circular portion and which is assembled into a self-aligning roller bearing, it is preferred as in the invention described in claim 15 to satisfy the condition: $0.3 \leq (I_1/I_3) \leq 1.0$.

The range (0.3 to 1.6) adopted for $(I_1/I_3)$ in the invention described in claim 11 is included entirely in the range (0.1 to 3.0) adopted for $(I_1/I_3)$ as in the invention described in Claim 1 and is specified with a narrower range.

In any of the present inventions described above, the strength of the cage is improved without lowering the load capacity of the bearing since the bending stress for each of the circular portions and the bending stress for the bar portion are designed such that they are not greatly different from each other in accordance with the type of the cage while considering the direction of load exerted from the roller.

Then, the ground is to be described.

At first, the ground for each of the inventions described in claims 1 to 10 is to be described with reference to FIG. 1 to FIG. 3.

Each of the loads in the circumferential direction and the radial direction of the bearing (radial direction) is exerted as an individual load or a composite load depending on the portion where the bearing is used and description of the grounds is to be made divisionally according to the direction of loads.

At first, description is to be made to a case where the load from the roller is applied in the circumferential direction.

For example, in a case where the bending stress $\sigma_1$ for the circular portion 5 is extremely larger compared with the bending stress $\sigma_3$ for the bar portion 7, that is, $\sigma_1 \gg \sigma_3$, since fracture of the cage 4 occurs at the area A of the circular portion 5, the strength can be improved by increasing the moment of inertia of area $I_1$ for the circular portion 5 and, at the same time, decreasing the moment of inertia of area $I_3$ for the bar portion 7 such that the space volume for holding the roller 3 is not decreased.

The moment of inertia of area can be increased usually by increasing the cross sectional area, while the moment of inertia of area can be decreased usually by decreasing the cross sectional area thereof. It is of course possible to change the moment of inertia of area by modifying the cross sectional shape.

On the contrary, in a case where the bending stress $\sigma_3$ for the bar portion 7 is extremely larger compared with the bending stress $\sigma_1$ for the circular portion 5, that is, $\sigma_3 >> \sigma_1$, since fracture of the cage 4 occurs at the area C of the bar portion 7, the strength can be improved by increasing the moment of inertia of area $I_3$ for the bar portion 7 and, at the same time, decreasing the moment of inertia of area $I_1$ for the circular portion 5 such that the space volume for holding the roller 3 is not decreased.

That is, in a case where there is a significant difference between the bending stress $\sigma_1$ for the circular portion 5 and the bending stress $\sigma_3$ for the bar portion 7, fracture of the cage 4 can be prevented by decreasing this difference of the stresses without decreasing the number of rollers or the size of the rollers, namely, without lowering the load capacity of the bearing.

In the same manner, also in a case where there is a large difference between the bending stress $\sigma_2$ for the circular portion 6 and the bending stress $\sigma_4$ for the bar portion 7, fracture of the cage 4 can be prevented by decreasing the difference of the stresses without decreasing the number of rollers or the size of the rollers.

That is, it is considered in the present invention to apply an optimal design of improving the load capacity for the entire cage by increasing the moment of inertia of area only for the portion where the bending stress increases, instead of improving the strength of the cage 4 by increasing all the moment of inertia of area for each portion of the cage 4 as in the prior art.

From the view point described above, according to the present invention, $(I_1/I_2)$ and $(I_1/I_3)$ for minimizing the maximum value of the bending stress are defined based on values for dimensional factors for each of the portions within the adoptable range in view of the design.

Further, the case where the load is applied from the radial direction of the bearing (radial direction) is also studied with by the same concept as that for the load from the circumferential direction.

That is, in a case where the bending stress $\sigma_1'$ for the circular portion 5 is extremely larger compared with the bending stress $\sigma_3'$ for the bar portion 7 for instance, that is, $\sigma_1' > \sigma_3'$, since fracture of the cage 4 occurs at the area A of the circular portion 5 shown in FIG. 26, the strength can be improved by increasing the moment of inertia of area $I_1'$ for the circular portion 5 and, at the same time, by decreasing the moment of inertia of area $I_3'$ for the bar portion 7 so as not to decrease the space volume for holding the roller 3.

The moment of inertia of area can be increased usually by increasing the cross sectional area, while the moment of inertia of area can be decreased usually by decreasing the cross sectional area thereof. It is of course possible to change the moment of inertia of area by modifying the cross sectional shape.

On the contrary, in a case where the bending stress $\sigma_3'$ for the bar portion 7 is extremely larger compared with the bending stress $\sigma_1'$ for the circular portion 5, that is, $\sigma_3' >> \sigma_1'$, since fracture of the cage 4 occurs at the area C for the bar portion 7 shown in FIG. 26, the strength can be improved by increasing the moment of inertia of area $I_3'$ for the bar portion 7 and, at the same time, decreasing the moment of inertia of area $I_1'$ for the circular portion 5 so as not to decrease the space volume for holding the roller 3.

That is, also in a case where there is a large difference between the bending stress aid for the circular portion 5 and the bending stress $\sigma_3'$ for the bar portion 7, the fracture of the cage 4 can be prevented by decreasing the difference of the stresses without decreasing the number of rollers or the size of the rollers, namely, without lowering the load capacity of the bearing.

In the same manner, also in a case where there is a large difference between the bending stress $\sigma_2'$ for the circular portion 6 and the bending stress $\sigma_4'$ for the bar portion 7, the fracture of the cage 4 can be prevented by decreasing the difference of the stresses without decreasing the number of rollers or the size of the rollers.

That is, it is considered in the present invention to apply optimal design of improving the load capacity for the entire cage by increasing the moment of inertia of area only for the portion in which the bending stress increases, instead of improving the strength of the cage 4 by increasing all the moment of inertia of area for each portions of the cage 4 as in the prior art.

Then, from the view point described above, $(I_1'/I_2')$ and $(I_1'/I_3')$ for minimizing the maximum value of the bending stress are defined in the present invention based on the values for dimensional factors for each of the portions within the adoptable range in view of the design.

The description has been made to a case where the circumferential load W and the radial load W' exert individually, but each of the concepts described above can be applied individually also to a cage to which loads from both of the directions are exerted, that is, a composite load comprising both of the loads are exerted repeatedly by decomposing the composite load into the circumferential component and the radial component.

Then, each of the critical meanings for the invention defined in claim 1 to claim 10 is to be described.

At first, the critical meaning relative to the circumferential load W is to be described.

When the relation between the non-dimensional maximum bending stress $(\sigma/\sigma_0)$, and $(I_1/I_2)$, $(I_1/I_3)$ is calculated on the basis of the model for the strength of materials, the result as shown in FIG. 4 was obtained.

The non-dimensional maximum bending stress $(\sigma/\sigma_0)$ is considered here because a non-dimensional concept can be applied to any magnitude of load, to improve the general utilizability.

Further, $\sigma$ described above is maximum among the bending stress $\sigma_1$ for the circular portion 5 in the connection section between the circular portion 5 and the bar portion 7, bending stress $\sigma_2$ for the second circular portion 6 in the connection section between the second circular portion 6 and the bar portion 7, and bending stress $\sigma_3$ for the bar portion 7 in the connection section between the circular portion 5 and the bar portion 7, bending stress $\sigma_4$ for the bar portion 7 in the connection section between the second circular portion 6 and the bar portion 7, based on the definition described above. Smaller a means less possibility of fracture of the cage 4 caused by collision between the roller 3 and the bar portion 7.

Further, $\sigma_0$ is the maximum bending stress caused to the bar portion 7 assuming a pair of the circular portions 5 and 6 as a rigid body.

The $(\sigma/\sigma_0)$ can be calculated if six parameters $(I_1/I_2)$, $(I_1/I_3)$, $(e_1/e_2)$, $(e_1/e_3)$, $(d_1/d_2)$ and $(d_1/d_3)$ are given.

In this case, $d_1$ and $d_2$ each represents the length of the circular portion 5 and the second circular portion 6, forming a roller containing pocket 8 and $d_3$ is the length of the bar portion 7, as shown in FIG. 2.

Then, in most of cages for use in the roller bearing, since the dimensional specifications yield the following equations: $(e_1/e_2)=0.2$ to $1.8$, $(e_1/e_3)=0.2$ to $1.2$, $(d_1/d_2)=0.8$ to $1.4$, $(d_1/d_3)=0.5$ to 3.0, each of the parameters: $(e_1/e_2)$, $(e_1/e_3)$, $(d_1/d_2)$ and $(d_1/d_3)$ is changed at random as shown in FIG. 4 within the ranges: $(e_1/e_2)=0.2$ to 1.8, $(e_1/e_3)=0.2$ to 1.2, $(d_1/d_2)=0.8$ to 1.4 and $(d_1/d_3)=0.5$ to 3.0 to determine the relation between $(I_1/I_2)$ and $(I_1/I_3)$ when $(\sigma/\sigma_0)$ takes the minimum value, and the minimum value $(\sigma/\sigma_0)$ as in FIG. 4.

In FIG. 4, the value $(\sigma/\sigma_0)$ is shown by a gray scale in which $(\sigma/\sigma_0)$ decreases as the color changes from white to black.

As can be seen from FIG. 4, if $(I_1/I_2)=0.8$ to 1.4 and $(I_1/I_3)=0.1$ to 3.0, they take optimal values among the possible ranges of design to minimize $(\sigma/\sigma_0)$ and it is possible to prevent the fracture of the cage for use in the roller bearing.

Based on this, it is defined in the present invention as: $0.8 \leq (I_1/I_2) \leq 1.4$ and $0.1 \leq (I_1/I_3) \leq 3.0$.

Then, symbol X in FIG. 4 is an example of determining $(I_1/I_2)$ and $(I_1/I_3)$ for minimizing $(\sigma/\sigma_0)$ in a case where $(e_1/e_3)$ and $(d_1/d_2)$ are not contained within the ranges: $(e_1/e_3)=0.2$ to 1.2, and $(d_1/d_2)=0.8$ to 1.4, respectively. $(I_1/I_2)$ and $(I_1/I_3)$ are not contained within the ranges: $(I_1/I_2)=0.8$ to 1.4 and $(I_1/I_3)=0.1$ to 3.0, and such cages are of an unpractical size with the value of $(e_1/e_3)$ or $(d_1/d_2)$ being not actually used.

Further, depending on the specifications of the roller bearing, the axial width of the circular portion 5 may be made relatively larger (to increase the cross section) than that of the second circular portion 6 as: $(e_1/e_2) \geq 1$.

Then, a relation between $(I_1/I_2)$ and $(I_1/I_3)$ when $(\sigma/\sigma_0)$ takes a minimum value, and the minimum value $(\sigma/\sigma_0)$ was determined within the ranges: $(e_1/e_2)=1$ to 1.8, $(e_1/e_3)=0.2$ to 1.2, $(d_1/d_2)=0.8$ to 1.4 and $(d_1/d_3)=0.5$ to 3.0.

The result is shown in FIG. 5.

As can be seen from FIG. 5, if $(I_1/I_2)=0.8$ to 1.4 and $(I_1/I_3)=0.1$ to 0.6, $(\sigma/\sigma_0)$ is minimized and the value $(\sigma/\sigma_0)$ is smaller compared with the case of FIG. 4.

That is, in a case of specifying such that the width of the circular portion 5 is made larger than that of the second circular portion 6 without decreasing the size of the pocket 8, that is, $(e_1/e_2) \geq 1$, it is particularly preferred to define as: $(I_1/I_2)=0.8$ to 1.4 and $(I_1/I_3)=0.1$ to 0.6 for preventing the fracture of the cage for use in the roller bearing and further optimization can be obtained.

Further, a tapered roller bearing is often used in such places where abrupt acceleration/deceleration or load fluctuations occur and the cage is liable to be fractured by collision between the roller 3 and the bar portion 7 as in mill speed reducer for various types of iron manufacturing rolling mills. Since most of tapered roller bearings are in the ranges: $(e_1/e_2)=0.2$ to 1.8, $(e_1/e_3)=0.2$ to 1.2, $(d_1/d_2)=1.0$ to 1.4 and $(d_1d_3)=0.5$ to 3.0, $(e_1/e_2)$, $(e_1/e_3)$, $(d_1/d_2)$ and $(d_1/d_3)$ are changed at random as parameters within these ranges and the relation between $(I_1/I_2)$ and $(I_1/I_3)$ when $(\sigma/\sigma_0)$ takes the minimum value, and the minimum value of $(\sigma/\sigma_0)$ was determined. The result is shown in FIG. 6.

As can be seen from FIG. 6, if $(I_1/I_2)=1.0$ to 1.4 and $(I_1/I_3)=0.1$ to 3.0, $(\sigma/\sigma_0)$ is minimized, and it is possible to prevent the fracture of the cage for use in the tapered roller bearing. That is, it can be seen that the cage for use in the tapered roller bearing is preferably designed optimally so as to provide: $1.0 \leq (I_1/I_2) \leq 1.4$ and $0.1 \leq (I_1/I_3) \leq 3.0$.

Further, among the tapered roller bearings, since those of particularly high frequency of use are in: $(d_1/d_2)=1.0$ to 1.2 and $(d_1/d_3)=0.5$ to 1.0, the relation between $(I_1/I_2)$ and $(I_1/I_3)$ when $(\sigma/\sigma_0)$ takes the minimum value, and the minimum value $(\sigma/\sigma_0)$ was determined within the ranges: $(e_1/e_2)=0.2$ to 1.8, $(e_1/e_3)=0.2$ to 1.2, $(d_1/d_2)=1.0$ to 1.2 and $(d_1/d_3)=0.5$ to 1.0, and the result shown in FIG. 7 was obtained.

As can be seen from FIG. 7, if $(I_1/I_2)=1.0$ to 1.2, and $(I_1/I_3)=0.1$ to 2.5, $(\sigma/\sigma_0)$ is minimized, which is preferred for preventing the fracture of the cage for use in the tapered roller bearing. That is, it can be seen that the cage for use in the tapered roller bearing is optimally designed preferably so as to provide: $1.0 \leq (I_1/I_2) \leq 1.2$ and $0.1 \leq (I_1/I_3) \leq 2.5$.

Further, depending on the specifications of the tapered roller bearing, the axial width of the circular portion 5 may be made larger than that of the second circular portion 6 as: $(e_1/e_2) \geq 1.0$.

Then, the relation between $(I_1/I_2)$ and $(I_1/I_3)$ when $(\sigma/\sigma_0)$ takes a minimum value, and the minimum value $(\sigma/\sigma_0)$ was determined within the ranges: $(e_1/e_2)=1.0$ to 1.8, $(e_1/e_3)=0.2$ to 1.2, $(d_1/d_2)=1.0$ to 1.2, $(d_1/d_3)=0.5$ to 1.0, the result shown in FIG. 8 was obtained.

As can be seen from FIG. 8, if $(I_1/I_2)=1.0$ to 1.2 and $(I_1/I_3)=0.1$ to 0.6, $(\sigma/\sigma_0)$ is minimized and, since the value $(\sigma/\sigma_0)$ is smaller compared with that in FIG. 7, it can be seen that a further preferred optimal design can be obtained in view of prevention of the fracture of the cage for use in the tapered roller bearing, by setting as: $(e_1/e_2) \geq 1.0$, that is, designing the axial width of the circular portion 5 larger than that of the second circular portion 6 and, at the same time, by setting as: $1.0 \leq (I_1/I_2) \leq 1.2$ and $0.1 \leq (I_1/I_3) \leq 0.6$.

Further, since most of cages for use in the self-aligning roller bearings are in the ranges: $(e_1/e_2)=0.2$ to 1.8, $(e_1/e_3)=0.6$ to 1.2, $(d_1/d_2)=0.8$ to 1.2, and $(d_1/d_3)=0.5$ to 3.0, $(e_1/e_2)$, $(e_1/e_3)$, $(d_1/d_2)$ and $(d_1/d_3)$ were changed at random as the parameters within these ranges and the relation between $(I_1/I_2)$ and $(I_1/I_3)$ when $(\sigma/\sigma_0)$ takes a minimum value, and the minimum value of $(\sigma/\sigma_0)$ was determined, the result shown in FIG. 9 was obtained.

As can be seen from FIG. 9, if $(I_1/I_2)=0.8$ to 1.2 and $(I_1/I_3)=0.3$ to 3.0, $(\sigma/\sigma_0)$ is minimized and it is possible to prevent the fracture of the cage for use in the self-aligning roller bearing. That is, it can be seen that $0.8 \leq (I_1/I_2) \leq 1.2$ and $0.3 \leq (I_1/I_3) \leq 3.0$ are desirable for the cage for use in the self-aligning roller bearing.

Further, among the self-aligning roller bearings, since those of particularly high frequency of use are in the ranges: $(d_1/d_2)=0.9$ to 1.1 and $(d_1/d_3)=0.8$ to 1.3, the relation between $(I_1/I_2)$ and $(I_1/I_3)$ when $(\sigma/\sigma_0)$ takes a minimum value, and the minimum value of $(\sigma/\sigma_0)$ was determined within the ranges: $(e_1/e_2)=0.2$ to 1.8, $(e_1/e_3)=0.6$ to 1.2, $(d_1/d_2)=0.9$ to 1.1 and $(d_1/d_3)=0.8$ to 1.3, the result as shown in FIG. 10 was obtained.

As can be seen from FIG. 10, if $(I_1/I_2)=0.9$ to 1.1 and $(I_1/I_3)=0.3$ to 2.5, $(\sigma/\sigma_0)$ is minimized, which is preferred in view of prevention of the fracture of the cage for use in the self-aligning roller bearing. That is, it can be seen that $0.9 \leq (I_1/I_2) \leq 1.1$ and $0.3 \leq (I_1/I_3) \leq 2.5$ is desirable in a case of the cage for use in the self-aligning roller bearing.

Further, depending on the specifications of the self-aligning roller bearing, the axial width of the circular portion 5 may be made larger than that of the second circular portion 6 to provide $(e_1/e_2) \geq 1.0$.

Then, the relation between $(I_1/I_2)$ and $(I_1/I_3)$ when $(\sigma/\sigma_0)$ takes a minimum value, and the minimum value $(\sigma/\sigma_0)$ was determined within the ranges: $(e_1/e_2)=1.0$ to 1.8, $(e_1/e_3)=0.6$ to 1.2, $(d_1/d_2)=0.9$ to 1.1 and $(d_1/d_3)=0.8$ to 1.3, the result shown in FIG. 11 was obtained.

As can be seen from FIG. 11, if $(I_1/I_2)=0.9$ to 1.1 and $(I_1/I_3)=0.3$ to 0.6, since $(\sigma/\sigma_0)$ is minimized and the value $(\sigma/\sigma_0)$ is smaller compared with that in FIG. 10, it is preferred to specify as: $(e_1/e_2) \geq 1.0$ and as: $(I_1/I_2)=0.9$ to 1.1 and $(I_1/I_3)$=0.3 to 0.6 for preventing the fracture of the cage for use in the self-aligning roller bearing. That is, by designing the axial width of the circular portion larger than that of the second circular portion, a further optimal design is possible as: $0.9 \leq (I_1/I_2) \leq 1.1$ and $0.3 \leq (I_1/I_3) \leq 0.6$.

Further, in the cage for use in the cylindrical roller bearing, since the cross sectional shape of the circular portion 5 is nearly equal the cross sectional shape of the circular portion 6, it can usually be regarded as: $(e_1/e_2)$=1.0 and $(d_1/d_2)$=1.0. Then, since most of the cages for use in the cylindrical roller bearing are within the ranges: $(e_1/e_3)$=0.2 to 0.8 and $(d_1/d_3)$=0.5 to 3.0, $(e_1/e_3)$ and $(d_1/d_3)$ were changed at random within the ranges, and the relation between $(I_1/I_3)$ when $(\sigma/\sigma_0)$ takes a minimum value, and the minimum value of $(\sigma/\sigma_0)$ was determined, the result as shown in FIG. 12 was obtained. In most of the cages for use in the cylindrical roller bearings, since the cross sectional shape of the circular portion 5 and the cross section shape of the circular portion 6 is usually equal substantially, $(I_1I_2)$ is about 1.0. Accordingly, it was defined as $(I_1/I_2)$=1.0.

As can be seen from FIG. 12, if $(I_1/I_3)$=0.1 to 0.4, $(\sigma/\sigma_0)$ is minimized, and it is possible to prevent the fracture of the cage for use in the cylindrical roller bearing. That is, it can be seen that the cage for use in the cylindrical roller bearing is optimally designed as: $0.1 \leq (I_1/I_3) \leq 0.4$.

Then, the critical meaning relative to the radial load of the bearing W' is to be described.

When the relation between the non-dimensional maximum bending stress $(\sigma'/\sigma_0')$, and $(I_1'/I_2')$, $(I_1'/I_3')$ was calculated based on the model for the strength of materials, the result as shown in FIG. 28 was obtained.

The non-dimensional maximum bending stress $(\sigma'/\sigma_0')$ is considered here because a non-dimensional concept can be applied to any magnitude of load, to improve the general utilizability.

Further, σ' described above is maximum among the bending stress $\sigma_1'$ for the circular portion 5 in the connection section between the circular portion 5 and the bar portion 7, bending stress $\sigma_2'$ for the second circular portion 6 in the connection section between the second circular portion 6 and the bar portion 7, bending stress $\sigma_3'$ for the bar portion 7 in the connection section between the circular portion 5 and the bar portion 7, and bending stress $\sigma_4'$ for the bar portion 7 in the connection section between the second circular portion 6 and the bar portion 7, based on the definition described above. smaller σ means less possibility of fracture of the cage 4 caused by collision between the roller 3 and the bar portion 7.

Further, $\sigma_0'$ is the maximum bending stress caused to the bar portion 7 regarding a pair of the circular portions 5 and 6 as a rigid body.

$(\sigma'/\sigma_0')$ can be calculated if six parameters $(I_1'/I_2')$, $(I_1'/I_3')$, $(e_1'/e_2')$, $(e_1'/e_3')$, $(d_1/d_2)$ and $(d_1/d_3)$ are given.

In this case, as shown in FIG. 26, $d_1$ and $d_2$ each represents the length of the circular portion 5 and the second circular portion 6, forming a roller holding pocket 8 respectively, and $d_3$ is the length of the bar portion 7.

Then, in most of cages for use in the roller bearing, since possible ranges in view of the dimensional factors are, respectively, $(e_1'/e_2')$=0.2 to 1.2, $(e_1'/e_3')$=0.8 to 4.2, $(d_1/d_2)$=0.8 to 1.4 and $(d_1/d_3)$=0.5 to 3.0, each of the parameters: $(e_1'/e_2')$, $(e_1'/e_3')$, $(d_1/d_2)$ and $(d_1/d_3)$ was changed at random within the ranges: $(e_1'/e_2')$=0.2 to 1.2, $(e_1'/e_3')$=0.8 to 4.2, $(d_1/d_2)$=0.8 to 1.4 and $(d_1/d_3)$=0.5 to 3.0 in FIG. 28, and the relation between $(I_1'/I_2')$ and $(I_1'/I_3')$ when $(\sigma'/\sigma_0')$ takes a minimum value, and the minimum value of $(\sigma'/\sigma_0')$ was determined as in FIG. 28.

In FIG. 28, the value $(\sigma'/\sigma_0')$ is shown by a gray scale in which $(\sigma'/\sigma_0')$ decreases as the color changes from white to black.

As can be seen from FIG. 28, if $(I_1'/I_2')$=0.5 to 2.7 and $(I_1'/I_3')$=0.2 to 6.0, they take optimal values among the possible ranges of design to minimize $(\sigma'/\sigma_0')$, and it is possible to prevent the fracture of the cage for use in the roller bearing.

Based on this, it is defined in the present invention as: $0.5 \leq (I_1'/I_2') \leq 2.7$ and $0.2 \leq (I_1'/I_3') \leq 6.0$.

Then, symbol X in FIG. 4 is an example of determining $(I_1'/I_2')$ and $(I_1'/I_3')$ for minimizing $(\sigma'/\sigma_0')$ in a case where any of $(e_1'/e_2')$, $(e_1'/e_3')$, $(d_1/d_2)$ and $(d_1/d_3)$ is not contained in the ranges: $(e_1'/e_2')$=0.2 to 1.2, $(e_1'/e_3')$=0.8 to 4.2, $(d_1/d_2)$=0.8 to 1.4 and $(d_1/d_3)$=0.5 to 3.0. $(I_1'/I_2')$ and $(I_1'/I_3')$ are not contained in the range $(I_1'/I_2')$=0.5 to 2.7 and $(I_1'/I_3')$=0.2 to 6.0, and such cages are of a not-practical size, with the value for any of $(e_1'/e_2')$, $(e_1'/e_3')$, $(d_1/d_2)$ or $(d_1/d_3)$ being not actually used.

Further, among roller bearings, since those of particularly high frequency of use in apparatus causing large vibrations such as axles of railway vehicles and vibrating screens are within the ranges: $(e_1'/e_2')$=0.2 to 1.2, $(e_1'/e_3')$=0.8 to 3.0, $(d_1/d_2)$=0.9 to 1.3 and $(d_1/d_3)$=0.5 to 1.2, each of the parameters $(e_1'/e_2')$, $(e_1'/e_3')$, $(d_1/d_2)$ and $(d_1/d_3)$ was changed at random within this range and the relation between $(I_1'/I_2')$ and $(I_1'/I_3')$ when $(\sigma'/\sigma_0')$ takes the minimum value, and the minimum value $(\sigma'/\sigma_0')$ was determined. The result is shown in FIG. 29.

As can be seen from FIG. 29, if $(I_1'/I_2')$=0.8 to 2.2 and $(I_1'/I_3')$=0.2 to 4.0, $(\sigma'/\sigma_0')$ is minimized and this is desirable for preventing the fracture of the cage for use in the roller bearing. That is, it can be seen that the cage for use in the roller bearing of particularly high frequency of use in apparatus causing large vibrations such as axles of railway vehicles and vibrating screens is preferably designed optimally so as to provide: $0.8 \leq (I_1'/I_2') \leq 2.2$ and $0.2 \leq (I_1'/I_3') \leq 4.0$.

Further, since most of cages for use in the tapered roller bearings are within the ranges: $(e_1'/e_2')$=0.2 to 1.0, $(e_1'/e_3e)$=0.8 to 4.2, $(d_1/d_2)$=1.0 to 1.4, and $(d_1/d_3)$=0.5 to 3.0, $(e_1'/e_2')$, $(e_1'/e_3')$, $(d_1/d_2)$ and $(d_1/d_3)$ were changed at random as the parameters within these ranges and the relation between $(I_1'/I_2')$ and $(I_1'/I_3')$ when $(\sigma'/\sigma_0')$ takes the minimum value, and the minimum value of $(\sigma'/\sigma_0')$ was determined. The result is shown in FIG. 30.

As can be seen from FIG. 30, if $(I_1'/I_2')$=1.0 to 2.7 and $(I_1'/I_3')$=0.2 to 6.0, $(\sigma'/\sigma_0')$ is minimized, and it is possible to prevent the fracture of the cage for use in the tapered roller bearing. That is, it can be seen that the cage for use in the tapered roller bearing is optimally designed preferably so as to provide: $1.0 \leq (I_1'/I_2') \leq 2.7$ and $0.2 \leq (I_1'/I_3') \leq 6.0$.

Further, among the tapered roller bearings, since those used in places of particularly high frequency of use in apparatus causing large vibrations such as axles of railway vehicles and vibrating screens are within the ranges: $(e_1'/e_2')$=0.2 to 1.0, $(e_1'/e_3')$=0.8 to 2.0, $(d_1/d_2)$=1.1 to 1.3 and $(d_1/d_3)$=0.5 to 1.0, $(e_1'/e_2')$, $(e_1'/e_3')$, $(d_1/d_2)$ and $(d_1/d_3)$ were changed at random wherein this range as the parameters and the relation between $(I_1'/I_2')$ and $(I_1'/I_3')$ when $(\sigma'/\sigma_0')$ takes the minimum value, and the minimum value of $(\sigma'/\sigma_0')$ was determined, the result as shown in FIG. 31 was obtained.

As can be seen from FIG. 31, if $(I_1'/I_2')$=1.3 to 2.2 and $(I_1'/I_3')$=0.8 to 4.0, $(\sigma'/\sigma_0')$ is minimized, which is preferred in view of prevention of the fracture of the cage for use in the tapered roller bearing. That is, it can be seen that the cage for use in the tapered roller bearing of particularly high frequency of use in apparatus causing large vibrations such in axles of railway vehicles and vibrating screens is optimally designed further preferably so as to provide: $1.3 \leq (I_1'/I_2') \leq 2.2$ and $0.8 \leq (I_1'/I_3') \leq 4.0$.

Further, since most of cages for use in the self-aligning roller bearings are within the ranges: $(e_1'/e_2')=0.2$ to 1.2, $(e_1'/e_3')=1.0$ to 3.0, $(d_1/d_2)=0.8$ to 1.2, and $(d_1/d_3)=0.5$ to 3.0, when $(e_1'/e_2')$, $(e_1'/e_3')$, $(d_1/d_2)$ and $(d_1/d_3)$ were changed at random as the parameters within these ranges and the relation between $(I_1'/I_2')$ and $(I_1'/I_3')$ where $(\sigma'/\sigma_0')$ takes the minimum value and the minimum value, $(\sigma'/\sigma_0')$ was determined, the result shown in FIG. 32 was obtained.

As can be seen from FIG. 32, if $(I_1'/I_2')=0.5$ to 1.7 and $(I_1'/I_3')=0.2$ to 4.0, $(\sigma'/\sigma_0')$ is minimized, and it is possible to prevent the fracture of the cage for use in the self-aligning roller bearing. That is, it can be seen that $0.5 \leq (I_1'/I_2') \leq 1.7$ and $0.2 \leq (I_1'/I_3') \leq 4.0$ are preferred in the cage for use in the self-aligning roller bearing.

Further, among the self-aligning roller bearings, since those used in places of particularly high frequency of use in apparatus causing large vibrations such as axles of railway vehicles and vibrating screens are within the ranges: $(e_1'/e_2')=0.8$ to 1.2, $(e_1'/e_3')=1.0$ to 3.0 $(d_1/d_2)=0.9$ to 1.1 and $(d_1/d_3)=0.8$ to 1.2, $(e_1'/e_2')$, $(e_1'/e_2')$, $(d_1/d_2)$ and $(d_1/d_3)$ were changed at random as the parameters within these ranges and the relation between $(I_1'/I_2')$ and $(I_1'/I_3')$ when $(\sigma'/\sigma_0')$ takes the minimum value and the minimum value $(\sigma'/\sigma_0')$ was determined. The result is shown in FIG. 33.

As can be seen from FIG. 33, if $(I_1'/I_2')=0.8$ to 1.3 and $(I_1'/I_3')=0.5$ to 4.0, $(\sigma'/\sigma_0')$ is minimized, which is desirable for preventing the fracture of the cage for use in the self-aligning roller bearing. That is, it can be seen that $0.8 \leq (I_1'/I_2') \leq 1.3$ and $0.5 \leq (I_1'/I_3') \leq 4.0$ are further desirable for the cage used for the self-aligning roller bearing, particularly, for those used in places of high frequency of use in apparatus causing large vibrations such as axles of railway vehicles and vibrating screens.

Further, in the cage for use in the cylindrical roller bearings, since the cross sectional shape of the circular portion 5 and the cross sectional shape of the circular portion 6 are nearly equal, it can usually be considered as: $(e_1'/e_2')=1.0$ and $(d_1/d_2)=1.0$. Then, since most of cages for use in the cylindrical roller bearings are within the ranges: $(e_1'/e_3')=0.8$ to 3.4 and $(d_1/d_3)=0.5$ to 3.0, $(e_1'/e_3')$ and $(d_1/d_3)$ were changed at random within these ranges and the relation between $(I_1'/I_3')$ when $(\sigma'/\sigma_0')$ takes the minimum value, and the minimum value of $(\sigma'/\sigma_0')$ was determined, the result shown in FIG. 34 was obtained. Further, in the cage for use in the cylindrical roller bearing, since the cross sectional shape of the circular portion 5 and the cross sectional shape of the circular portion 6 are usually identical substantially, $(I_1'/I_2')$ was about 1.0. Therefore, it was determined as $(I_1'/I_2')=1.0$.

As can be seen from FIG. 34, if $(I_1'/I_3')=0.2$ to 0.8, $(\sigma'/\sigma_0')$ is minimized, and it is possible to prevent the fracture of the cage for use in the cylindrical roller bearing. That is, it can be seen that the cage for use in the cylindrical roller bearing is preferably designed optimally so as to provide: $0.2 \leq (I_1'/I_3') \leq 0.8$.

Further, among the cylindrical roller bearings, since those used in places of particularly high frequency of use in apparatus causing large vibrations such as axles of railway vehicles and vibrating screens are within the ranges: $(e_1'/e_3')=0.8$ to 1.6 and $(d_1/d_3)=0.5$ to 1.0, $(e_1'/e_3')$ and $(d_1/d_3)$ were changed at random as the parameters within the ranges, and the relation between $(I_1'/I_3')$ when $(\sigma'/\sigma_0')$ takes the minimum value and the minimum value $(\sigma'/\sigma_0')$ was determined. The result is shown in FIG. 35. In the cage for use in the cylindrical roller bearing, since the cross sectional shape of the circular portion 5 and the cross sectional shape of the circular portion 6 are usually identical substantially, $(I_1'/I_2')$ is about 1.0. Therefore, it is defined as $(I_1'/I_2')=1.0$.

As can be seen from FIG. 35, if $(I_1'/I_3')=0.2$ to 0.4, $(\sigma'/\sigma_0')$ is minimized, which is preferred for preventing the fracture of the cage for use in the cylindrical roller bearing. That is, it can be seen that $0.2 \leq (I_1'/I_3') \leq 0.4$ is further desirable for the cage for use in the cylindrical roller bearing, particularly those used in places of high frequency in use in apparatus causing large vibrations such as axles of railway vehicles and vibrating screens.

It has been described to the case in which the load in the rotational direction (circumferential direction) of the roller and the load in the bearing radial direction of the cage are exerted individually in the foregoing description but, for improving the strength to the exertion of the load composed of both of the loads, $(I_1/I_2)$, $(I_1/I_3)$ and $(I_1'/I_2')$, $(I_1'/I_3')$ may be set so as to be within the ranges described above.

Then, description is to be made for the ground of the inventions in claims 11 to 15 with reference to FIGS. 14 to 17.

For example, in a case where the bending stress $\sigma_1$ for the circular portion 5 is extremely larger compared with the bending stress $\sigma_3$ for the bar portion 7, that is, $\sigma_1 >> \sigma_3$, since fracture of the cage 4 occurs at the area A of the circular portion 5, the strength can be improved by increasing the moment of inertia of area $I_1$ for the circular portion 5 and, at the same time, decreasing the moment of inertia of area $I_3$ for the bar portion 7 such that the space volume for holding the roller is not decreased. The moment of inertia of area can be decreased usually by decreasing the cross sectional area thereof. It is of course possible to change the moment of inertia of area by modifying the cross sectional shape.

On the contrary, in a case where the bending stress $\sigma_3$ for the bar portion 7 is extremely larger compared with the bending stress $\sigma_1$ for the circular portion 5, that is, $\sigma_3 >> \sigma_1$, since fracture of the cage 4 occurs at the area C of the bar portion 7, the strength can be improved by increasing the moment of inertia of area $I_3$ for the bar portion 7 and, at the same time, decreasing the moment of inertia of area $I_1$ of the circular portion 5 such that the space volume for holding the roller 3 is not decreased.

That is, in a case where there is a significant difference between the bending stress $\sigma_1$ for the circular portion 5 and the bending stress $\sigma_3$ for the bar portion 7, fracture of the cage 4 can be prevented by decreasing the difference of the bending stresses without decreasing the number of rollers or the size of the rollers. It is considered in present invention to apply an optimal design of improving the load capacity for the entire cage by increasing the moment of inertia of area only for the portion where the bending stress increases, instead of improving the strength of the cage 4 by increasing all the moment of inertia of area for each portion of the cage 4 as in the prior art.

From the view point described above, according to the present invention, $(I_1/I_3)$ for minimizing the maximum value of the bending stress is defined based on the values for dimensional factors for each of the portions within the adoptable range in view of the design.

Then, the critical meanings for the inventions defined in claim 11 to claim 15 are to be described.

When the relation between the non-dimensional maximum bending stress $(\sigma/\sigma_0)$ and $(I_1/I_3)$ is calculated on the basis of the model in view of the strength of materials, a result as shown in FIG. 18 was obtained. The non-dimensional maximum bending stress ($\sigma/\sigma_0$) is considered here because a non-dimensional concept can be applied to any magnitude of load, to improve the general utilizability.

Further, $\sigma$ described above is maximum among the bending stress $\sigma_1$ for the circular portion 5 in the connection section between the circular portion 5 and the bar portion 7 and the bending stress $\sigma_3$ for the bar portion 7 in the connection section between the circular portion 5 and the bar portion 7, based on the definition described above. Smaller $\sigma$ means less fracture of the cage 4 caused by collision between the roller 3 and the bar portion 7. Further, $\sigma_0$ is the maximum bending stress caused to the bar portion 7 regarding a pair of circular portion 5 as a rigid body.

The ($\sigma/\sigma_0$) can be calculated if three parameters ($I_1/I_3$), ($e_1/e_3$) and ($d_1/d_3$) are given.

Then, as shown in FIG. 15, $d_1$ is a circumferential distance between two adjacent bar portions 7, 7 in the circumferential direction. The two bar portions 7, 7 adjacent in the circumferential direction protrude from the identical axial side of the cage relative to the circular portion 5 in a case where the cage is a two component type as shown in FIG. 15 but protrude from the axial sides of the cage opposite to each other relative to the circular portion 5 in a case where the cage is a one component type as shown in FIG. 16. Further, $d_3$ is an axial distance from a position at which load W is exerted by collision with the roller 3 (position of arrow F in FIG. 15) on the lateral surface of the bar portion 7 opposing to the rolling surface of the roller 3 to the lateral side of the circular portion 5 opposing to the end surface of the roller 3.

Then, in most of cages for use in the roller bearing, since ($e_1/e_3$)=0.6 to 3.2 and ($d_1/d_3$)=0.2 to 3.0, each of the parameters: ($e_1/e_3$) and ($d_1/d_3$) is changed at random within the ranges: ($e_1/e_3$)=0.6 to 3.2 and ($d_1/d_3$)=0.2 to 3.0 to determine the relation between ($I_1/I_3$) when ($\sigma/\sigma_0$) takes the minimum value, and the minimum value of ($\sigma/\sigma_0$) as in FIG. 18.

As can be seen from FIG. 18, if ($I_1/I_3$)=0.3 to 1.6, it takes an optimal value among the possible range of design to minimize ($\sigma/\sigma_0$), and it is possible to prevent the fracture of the cage for use in the roller bearing.

Based on this, it is defined in the present invention as: $0.3 \leq (I_1/I_3) \leq 1.6$.

Then, symbol X in FIG. 18 is an example of determining ($I_1/I_3$) for minimizing ($\sigma/\sigma_0$) in a case where ($e_1/e_3$) is not contained within the ranges: ($e_1/e_3$)=0.6 to 3.2. In this case, ($I_1/I_3$) is not contained within the ranges: ($I_1/I_3$)=0.8 to 1.6 and such a cage is of an unpractical size with the value of ($e_1/e_3$) being not used actually.

Further, a double row cylindrical roller bearing or a self-aligning roller bearing is often used in such places where extremely large loads are applied on the bearing as in various kinds of iron making rolling mills. In most of double row cylindrical roller bearings,. since the ranges are: ($e_1/e_3$)=0.6 to 1.8, and ($d_1/d_3$)=0.6 to 2.2 in a case where the cage is a two component type, ($e_1/e_3$) and ($d_1/d_3$) are changed at random as parameters within the ranges described above and the relation between ($I_1/I_3$) when ($\sigma/\sigma_0$) takes a minimum value, and the minimum value of ($\sigma/\sigma_0$) was determined. The result is shown in FIG. 19.

As can be seen from FIG. 19, if ($I_1/I_3$)=0.3 to 0.9, ($\sigma/\sigma_0$) is minimized, and it is possible to prevent the fracture of the cage for use in the double row cylindrical roller bearing. That is, it can be seen that the two component type cage for use in the double row cylindrical roller bearing is preferably designed optimally so as to provide: $0.3 \leq (I_1/I_3) \leq 0.9$.

Further, in most of double row cylindrical roller bearings, since the ranges are: ($e_1/e_3$)=1.4 to 3.2, and ($d_1/d_3$)=0.6 to 1.8 in a case where the cage is a one component type, ($e_1/e_3$) and ($d_1/d_3$) are changed at random as parameters within the ranges described above and the relation between ($I_1/I_3$) when ($\sigma/\sigma_0$) takes a minimum value, and the minimum value of ($\sigma/\sigma_0$) was determined. The result is shown in FIG. 20.

As can be seen from FIG. 20, if ($I_1/I_3$)=0.7 to 1.6, ($\sigma/\sigma_0$) is minimized, and it is possible to prevent the fracture of the cage for use in the double row cylindrical roller bearing. That is, it can be seen that the one component type cage for use in the double row cylindrical roller bearing is preferably designed optimally so as to provide: $0.7 \leq (I_1/I_3) \leq 1.6$.

Further, in most of self-aligning roller bearings, since the ranges are: ($e_1/e_3$)=1.0 to 3.0, and ($d_1/d_3$)=0.6 to 3.0 in a case where the cage is a two component type, ($e_1/e_3$) and ($d_1/d_3$) are changed at random as parameters within the ranges described above and the relation between ($I_1/I_3$) when ($\sigma/\sigma_0$)takes a minimum value, and the minimum value of ($\sigma/\sigma_0$) was determined. The result is shown in FIG. 21.

As can be seen from FIG. 21, if ($I_1/I_3$)=0.5 to 1.5, ($\sigma/\sigma_0$) is minimized, and it is possible to prevent the fracture of the cage for use in the self-aligning roller bearing. That is, it can be seen that the two component type cage for use in the self-aligning roller bearing is preferably designed optimally so as to provide: $0.5 \leq (I_1/I_3) \leq 1.5$.

Further, in most of self-aligning roller bearings, since the ranges are: ($e_1/e_3$)=0.6 to 2.0, and ($d_1/d_3$)=0.2 to 1.2 in a case where the cage is one component type, ($e_1/e_3$) and ($d_1/d_3$) are changed at random as parameters within the ranges described above and the relation between ($I_1/I_3$) when ($\sigma/\sigma_0$) takes a minimum value, and the minimum value of ($\sigma/\sigma_0$) was determined. The result is shown in FIG. 22.

As can be seen from FIG. 22, if ($I_1/I_3$)=0.3 to 1.0, ($\sigma/\sigma_0$) is minimized, and it is possible to prevent the fracture of the cage for use in the self-aligning roller bearing. That is, it can be seen that the one component type cage for use in the self-aligning roller bearing is preferably designed optimally so as to provide: $0.3 \leq (I_1/I_3) \leq 1.0$.

As can be seen from FIG. 18 to FIG. 22, as the value ($I_1/I_3$) is larger, the value ($\sigma/\sigma_0$) also increases to provide an apparent disadvantage and reduced the impact durability. Accordingly, it is desirable to keep the value ($I_1/I_3$) smaller depending on the conditions used.

BRIEF DESCRIPTION OF THE DRAWINGS

Then, drawings are to be described briefly.

FIG. 2 represents a fragmentary planer view of a cage for use in a tapered roller bearing.

BEST MODE FOR PRACTICING THE INVENTION

Then, a first embodiment of the present invention is to be described with reference to the drawings.

First and second embodiments are examples of cages assembled in a roller bearing used in such places where rollers repeat circumferential collision to bar portions of the cage due to the change of the rotational speed of the roller and a third embodiment is an example of a cage assembled in a roller bearing used in such places as railway vehicles where vibrations occur frequently in the bearing radial direction of a cage and rollers repeat radial collision to the bar portions of the cage.

Figure 1A:
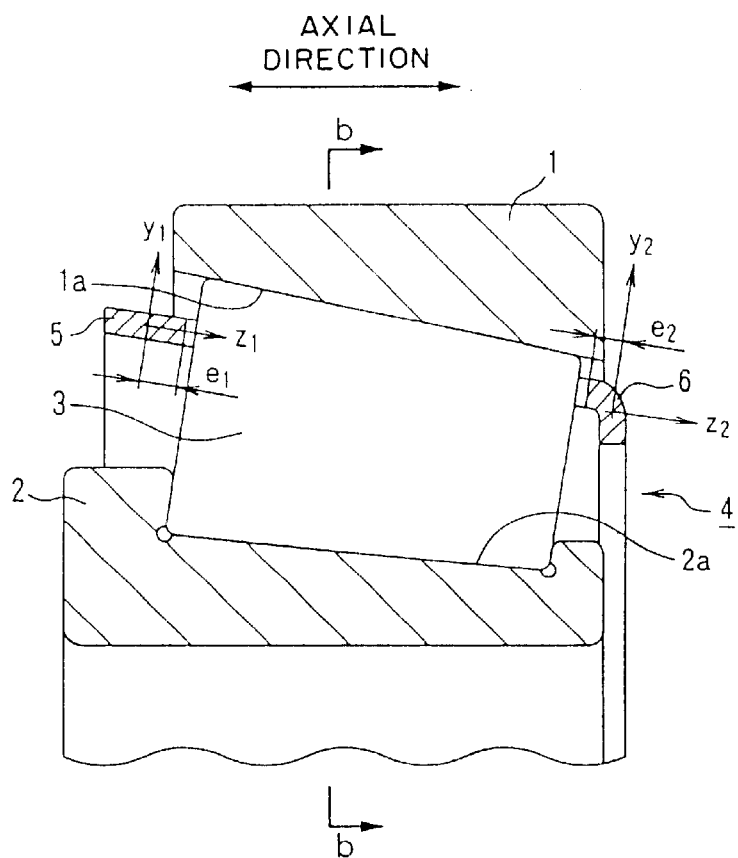
FIG. 1 is a view showing a tapered roller bearing in which (A) represents a fragmentary cross sectional view thereof and (B) represents a b—b cross sectional view thereof.
Figure 1B:
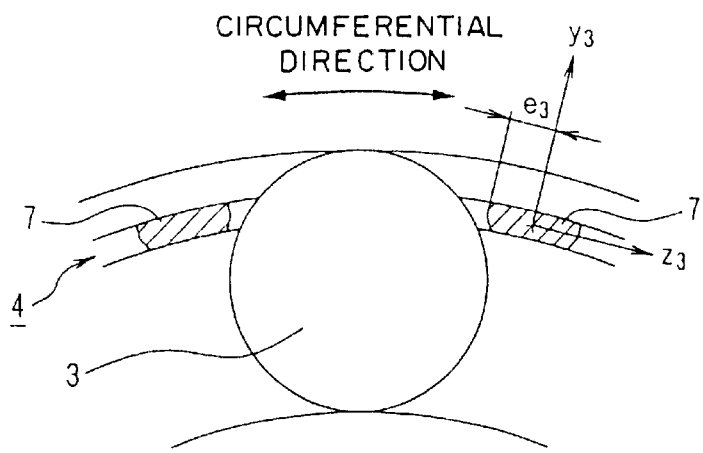
Figure 3:
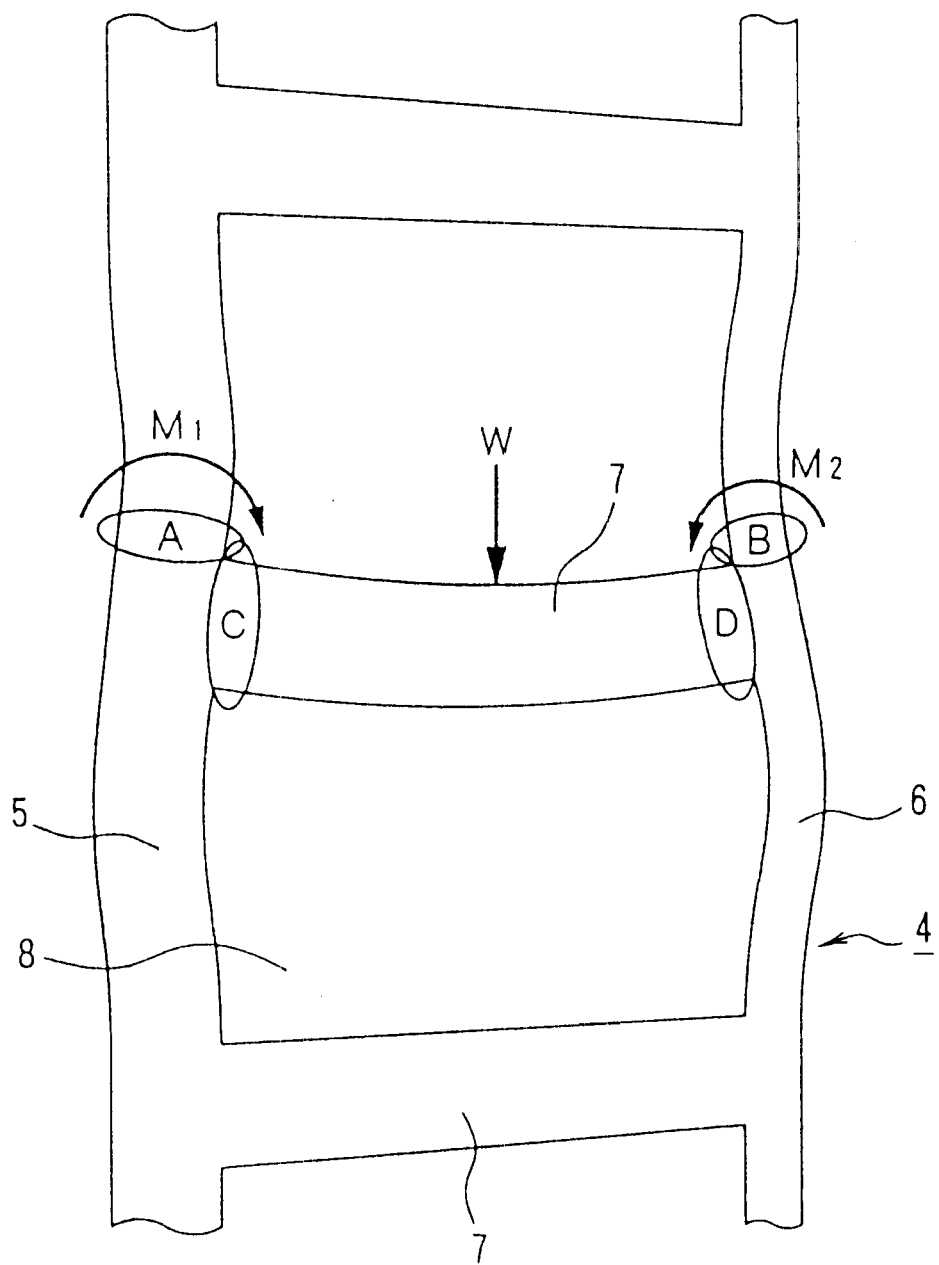
FIG. 3 is a schematic view showing the deformation of a cage caused by collision between a roller and a bar portion in a cage for use in a tapered roller bearing.
Figure 4:
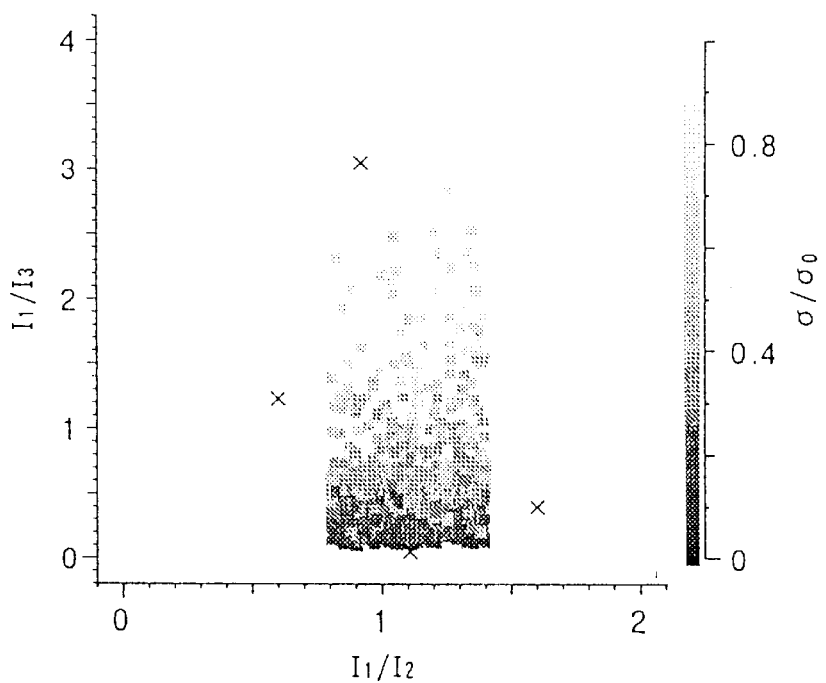
FIG. 4 is a graph showing the result of calculation for the non-dimensional maximum bending stress caused by collision between a roller and a bar portion in a cage for use in a roller bearing according to the present invention.
Figure 5:
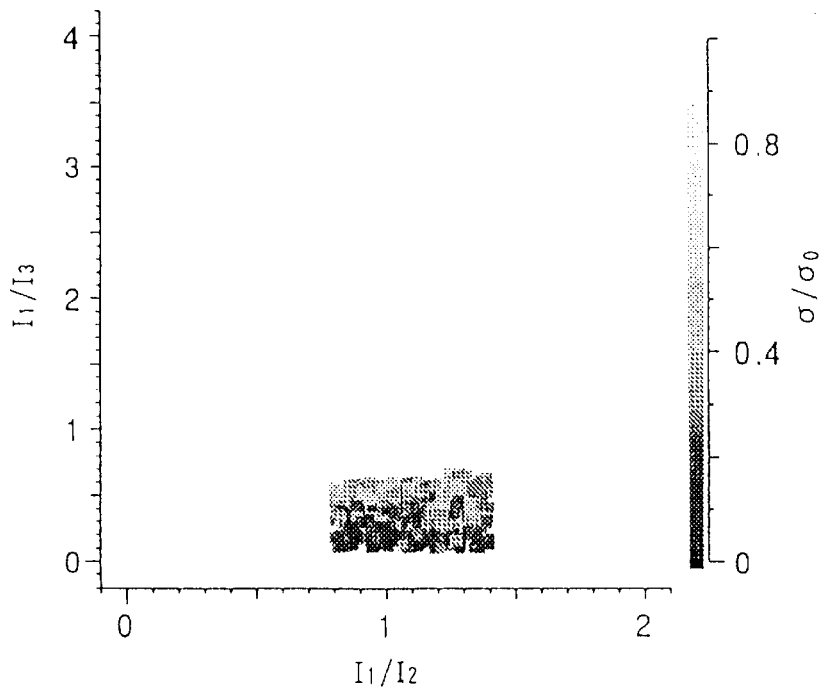
FIG. 5 is a graph showing the result of calculation for the non-dimensional maximum bending stress caused by collision between a roller and a bar portion in a case where ($e_1/e_2$)≧1 in a cage for use in a roller bearing according to the present invention.
Figure 6:
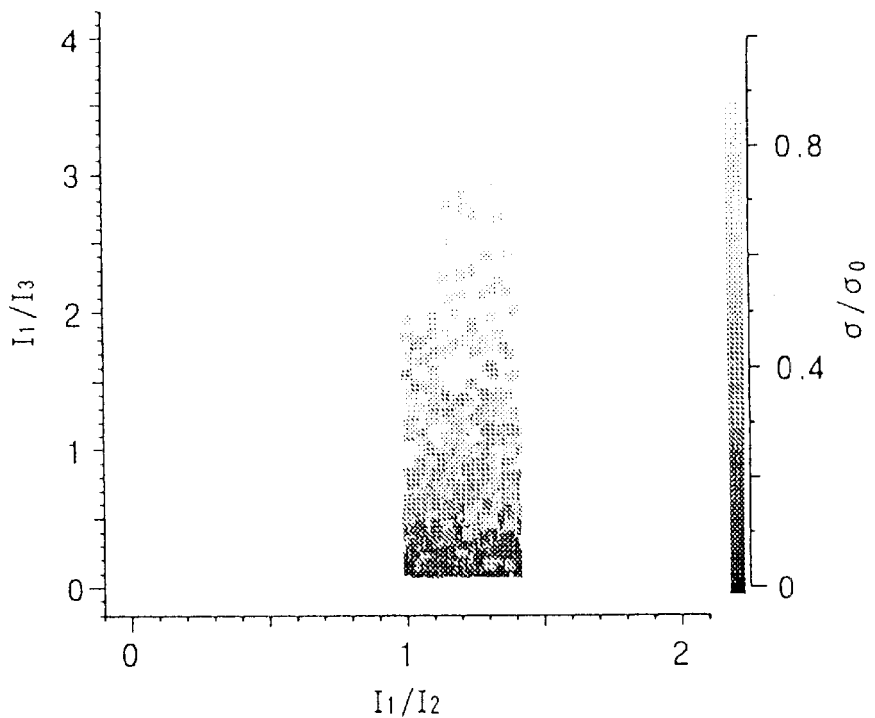
FIG. 6 is a graph showing the result of calculation for the non-dimensional maximum bending stress caused by collision between a roller and a bar portion in a cage for use in a tapered roller bearing according to the present invention.
Figure 7:
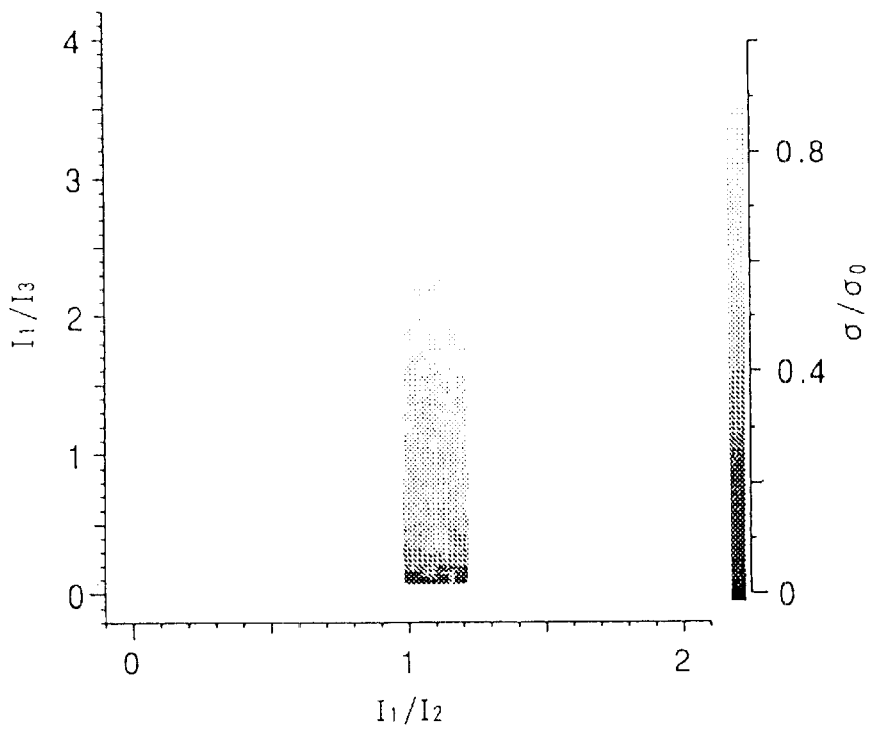
FIG. 7 is a graph showing the result of calculation for the non-dimensional maximum bending stress caused by collision between a roller and a bar portion in a cage for use in a tapered roller bearing of particularly high frequency of use.
Figure 8:
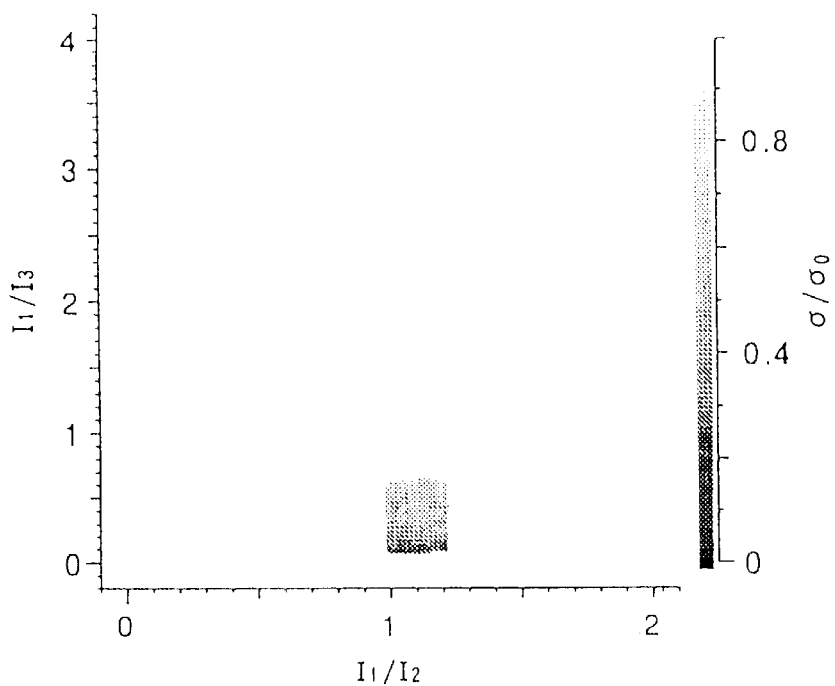
FIG. 8 is a graph showing the result of calculation for the non-dimensional maximum bending stress caused by collision between a roller and a bar portion in a case where $(e_1/e_2) \geqq 1$ in a cage for use in a tapered roller bearing of particularly high frequency of use.
Figure 9:
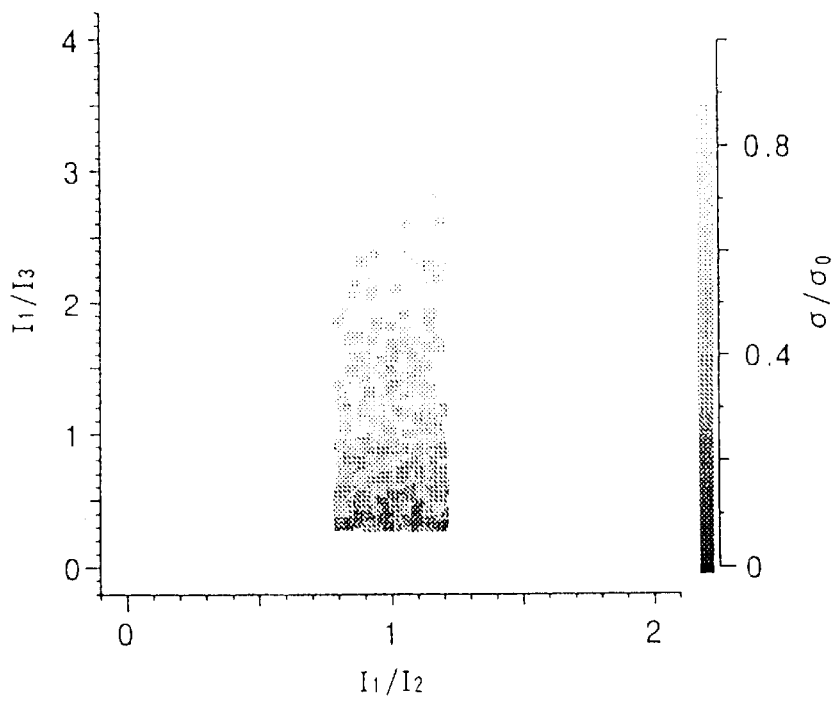
FIG. 9 is a graph showing the result of calculation for the non-dimensional maximum bending stress caused by collision between a roller and a bar portion in a cage for use in a self-aligning roller bearing.
Figure 10:
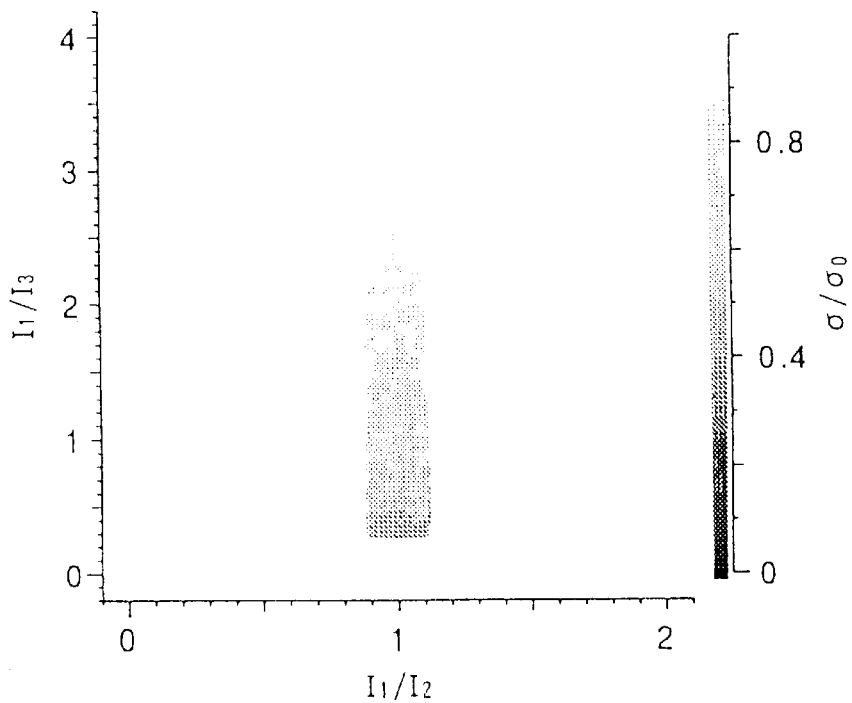
FIG. 10 is a graph showing the result of calculation for the non-dimensional maximum bending stress caused by collision between a roller and a bar portion in a cage for use in a self-aligning roller bearing of particularly high frequency of use.
Figure 11:
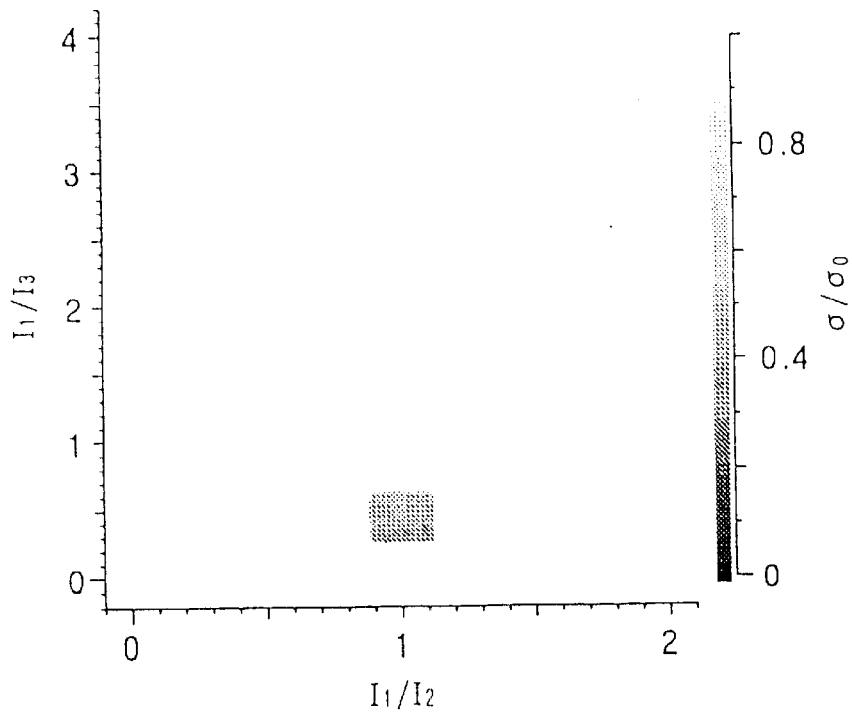
FIG. 11 is a graph showing the result of calculation for the non-dimensional maximum bending stress caused by collision between a roller and a bar portion in a case where $(e_1/e_2) \geqq 1$ in a cage for use in a self-aligning roller bearing of particularly high frequency of use.
Figure 12:
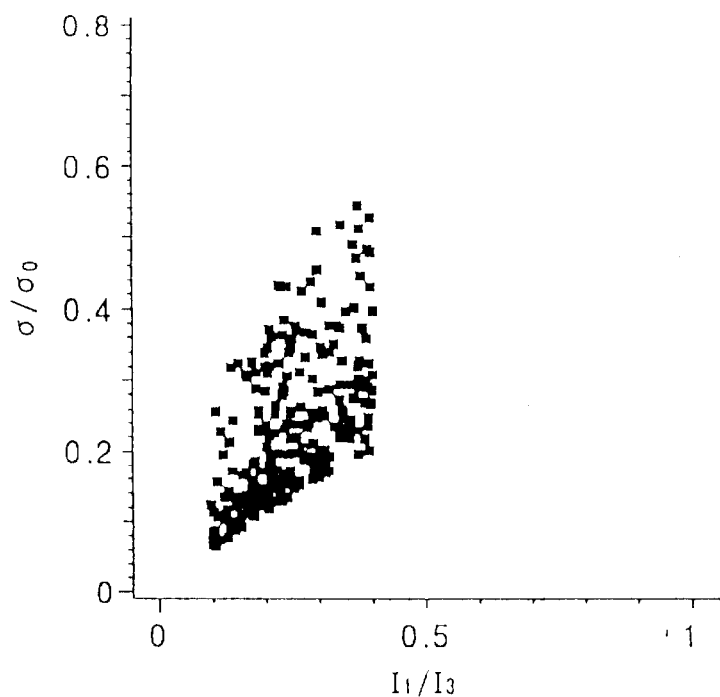
FIG. 12 is a graph showing the result of calculation for the non-dimensional maximum bending stress caused by collision between a roller and a bar portion in a cage for use in a cylindrical roller bearing.

The cage 4 of this embodiment is assembled in a tapered roller bearing as shown in FIG. 1 and FIG. 2.

The width for each of circular portions 5, 6 and a bar portion 7 was set such that respective moment of inertia of area $I_1$, $I_2$ and $I_3$ for a pair of the circular portion 5, 6 and the bar portion 7 are: $0.8 \leq (I_1/I_2) \leq 1.4$ and $0.1 \leq (I_1/I_3) \leq 3.0$.

Thus, the strength of the cage 4 was improved without decreasing the number of pockets 8 or the volume of the space for each of the pockets 8 by so much.

That is, since the bending stress for the circular portion 5, the bending stress for the second circular portion 6 and the bending stress for the bar portion 7 were optimally designed such that they are not different greatly from each other, it is possible to prevent the fracture of the cage 4 caused by collision between the roller 3 and the bar portion 7 without lowering the load capacity of the bearing.

Then, the second embodiment of the present invention is to be described with reference to the drawings.

Figure 14A:
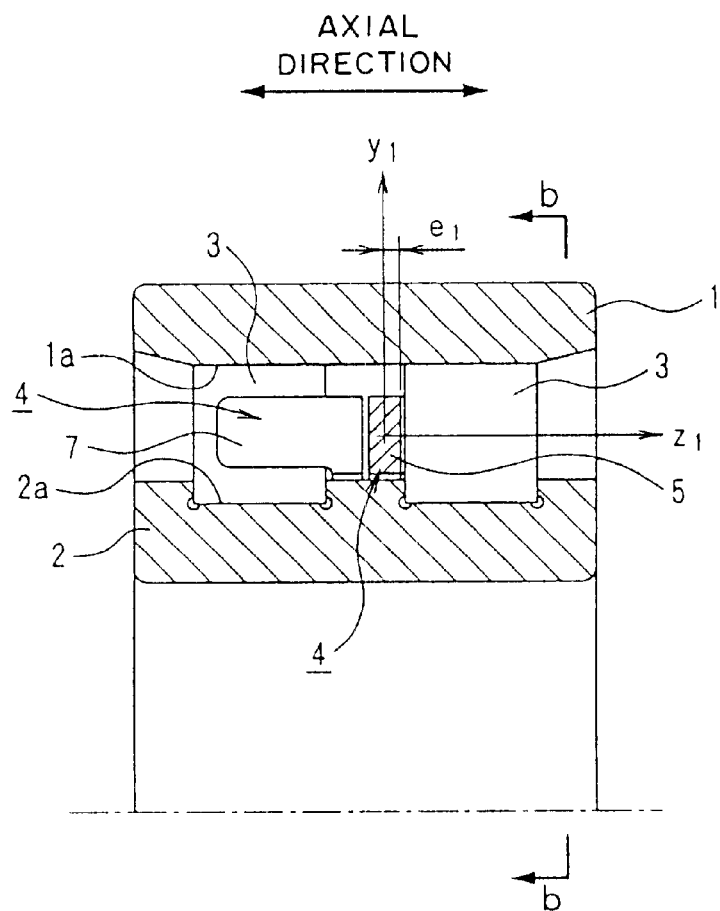
FIG. 14 is a view showing a double row cylindrical roller bearing, in which (A) is a fragmentary cross sectional view thereof and (B) is a b—b cross sectional view thereof.
Figure 14B:
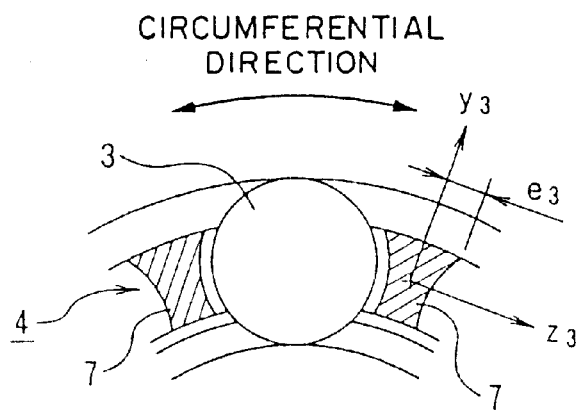
Figure 15:
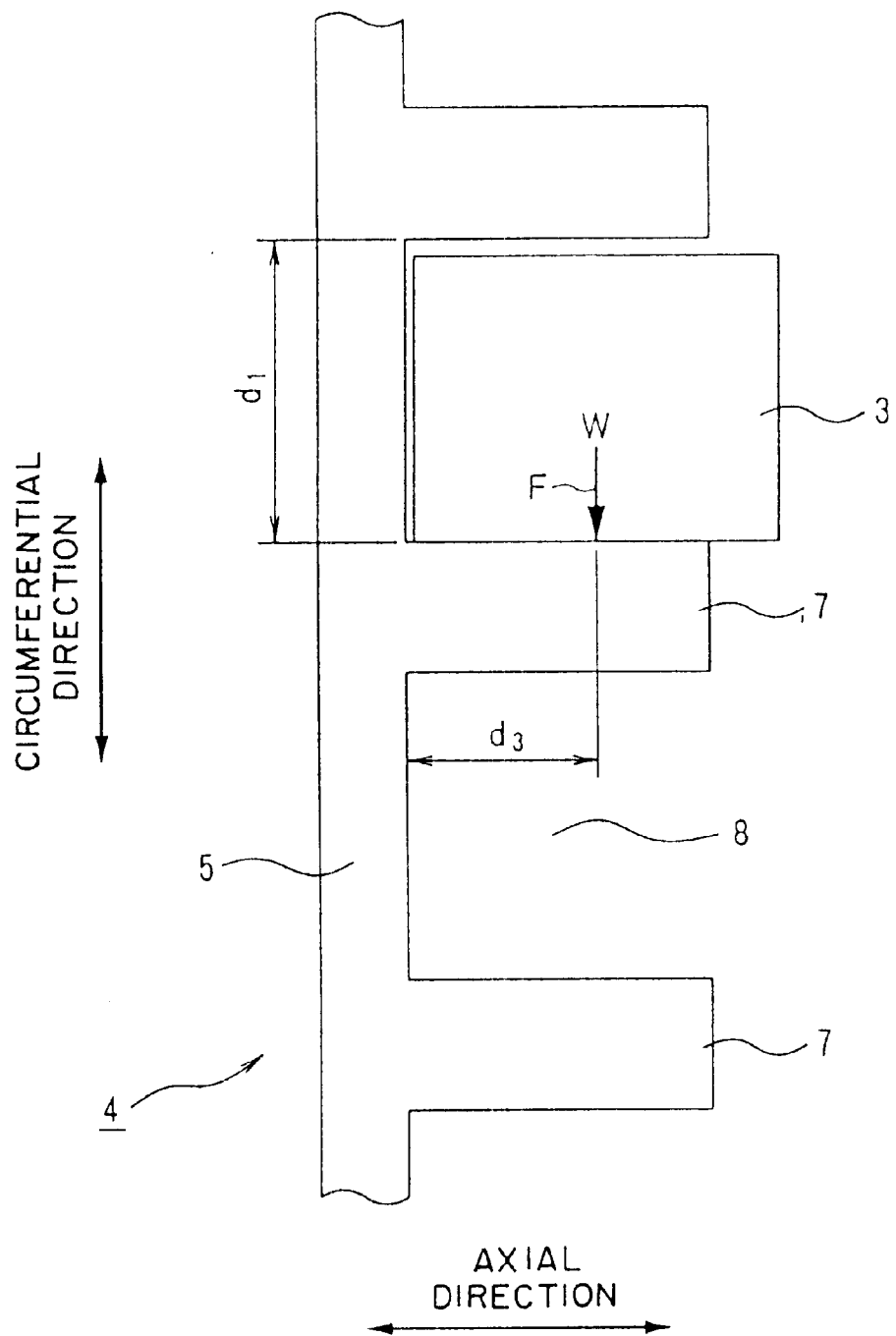
FIG. 15 is a fragmentary plane view of a two component type cage for use in a double row cylindrical roller bearing.
Figure 16:
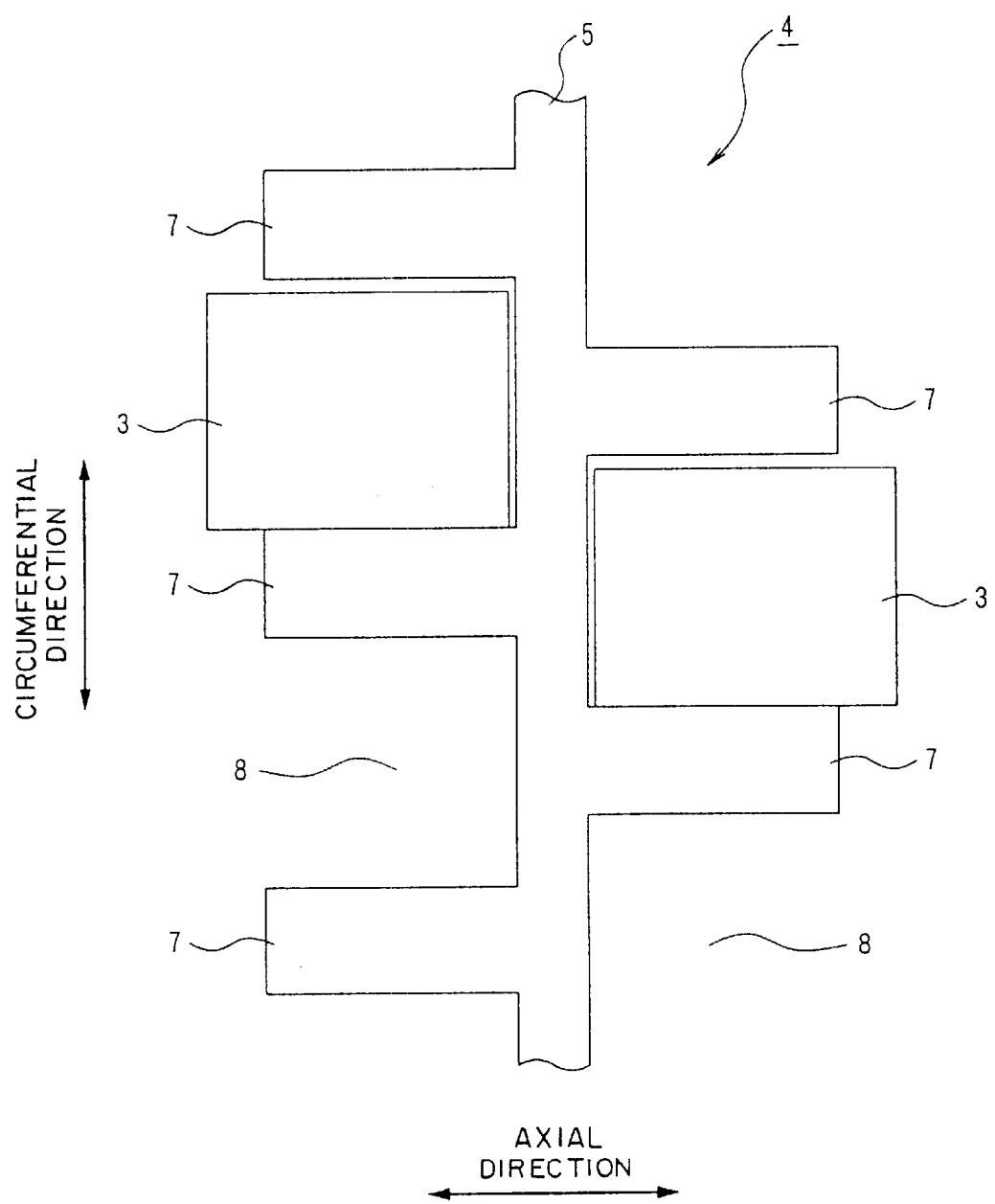
FIG. 16 is a fragmentary plane view of a one component type cage for use in a double row cylindrical roller bearing.
Figure 17:
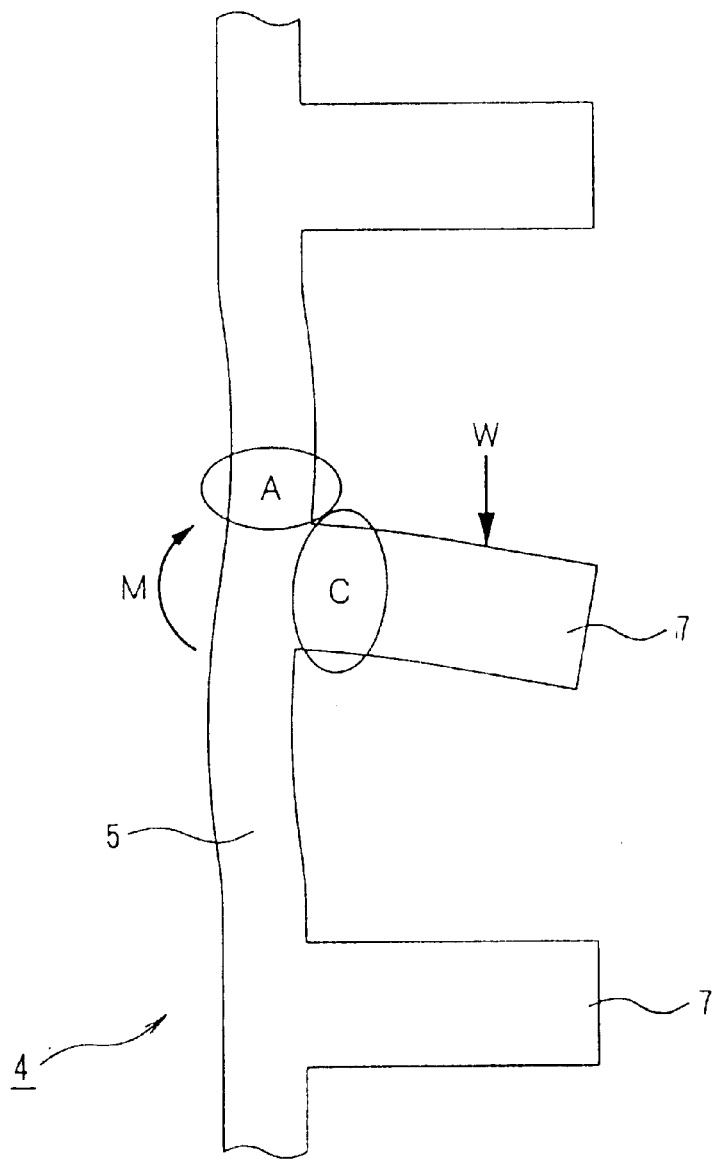
FIG. 17 is a schematic view showing the deformation of a cage caused by collision between a roller and a bar portion in a cage for use in a double row cylindrical roller bearing.

The cage 4 of this embodiment is assembled in a double row cylindrical roller bearing as shown in FIG. 14 and FIG. 15.

Each width for the circular portions and bar portions was set such that each of the moment of inertia of area $I_1$ and $I_3$ for a circular portion 5 and a bar portion 7 is: $0.3 \leq (I_1/I_3) \leq 1.6$.

Thus, strength of the cage 4 was improved without decreasing the number of pockets 8 and the volume of the space for each of the pockets 8 by so much.

That is, since the bending stress for the circular portion 5, and the bending stress for the bar portion 7 were optimally designed such that they were not different greatly from each other, it was possible to prevent the fracture of the cage 4 caused by collision between the roller 3 and the bar portion 7 without lowering the load capacity of the bearing.

Then, the third embodiment is to be described with reference to the drawings.

Figure 27A:
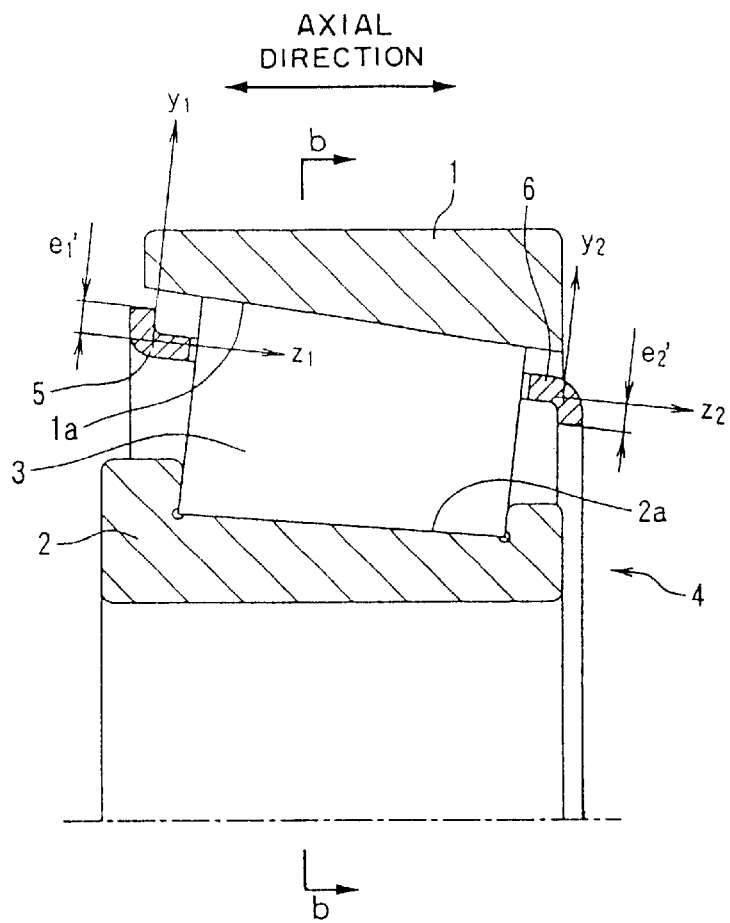
FIG. 27 is a view showing a tapered roller bearing, in which (A) is a fragmentary cross sectional view thereof and (B) is a b—b cross sectional view thereof.
Figure 27B:
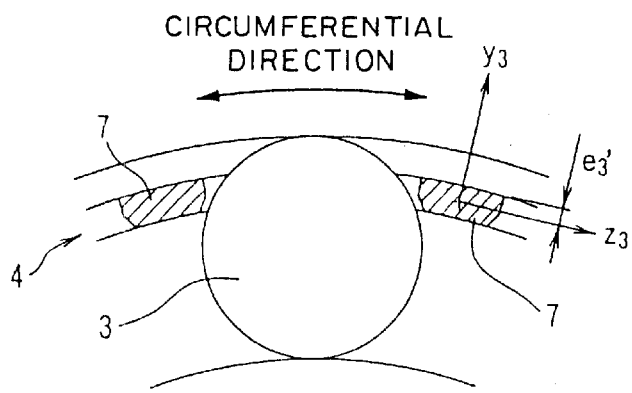
Figure 28:
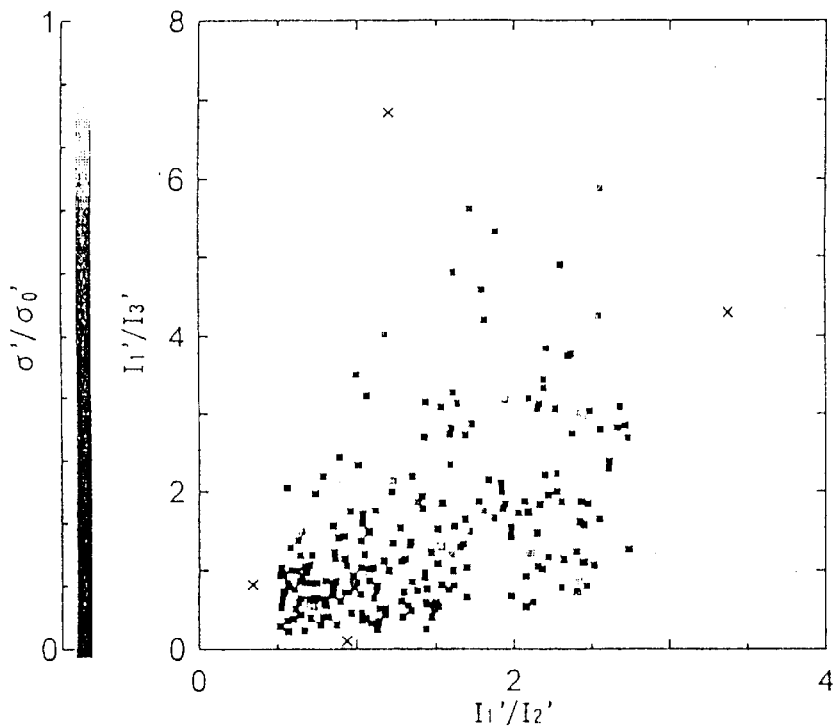
FIG. 28 is a graph showing the result of calculation for the non-dimensional maximum bending stress caused by collision between a roller and a bar portion in a cage for use in a roller bearing according to the present invention.
Figure 29:
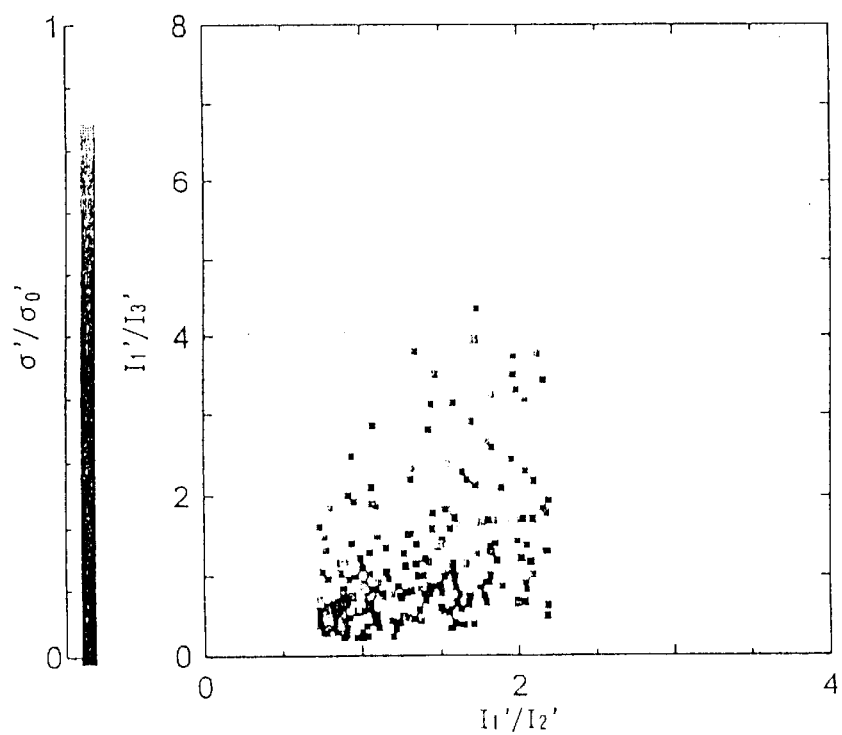
FIG. 29 is a graph showing the result of calculation for the non-dimensional maximum bending stress caused by collision between a roller and a bar portion in a cage for use in a roller bearing of particularly high frequency of use.
Figure 30:
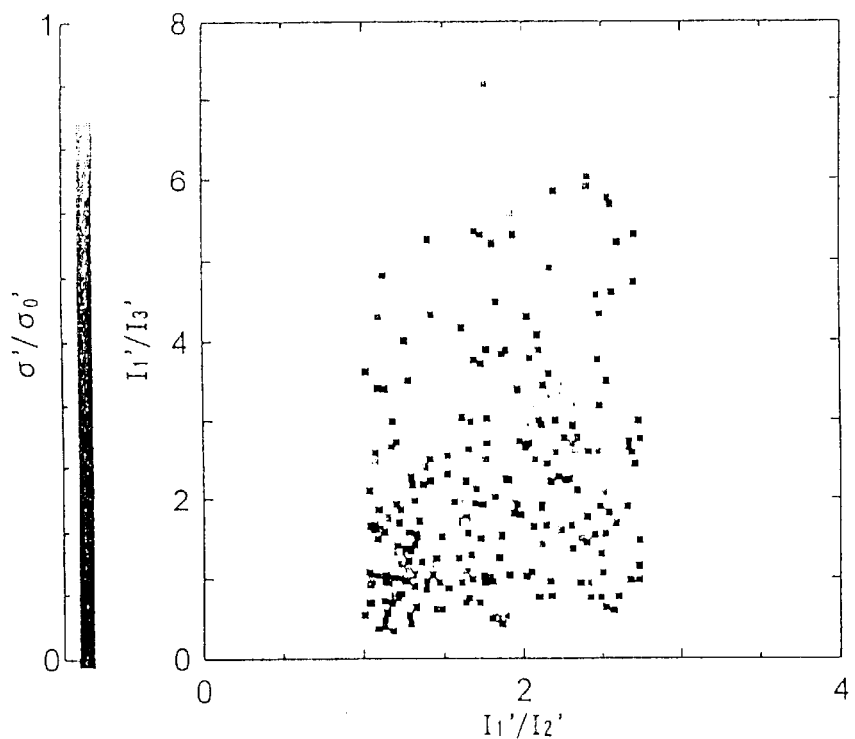
FIG. 30 is a graph showing the result of calculation for the non-dimensional maximum bending stress caused by collision between a roller and a bar portion in a cage for use in a tapered roller bearing according to the present invention.
Figure 31:
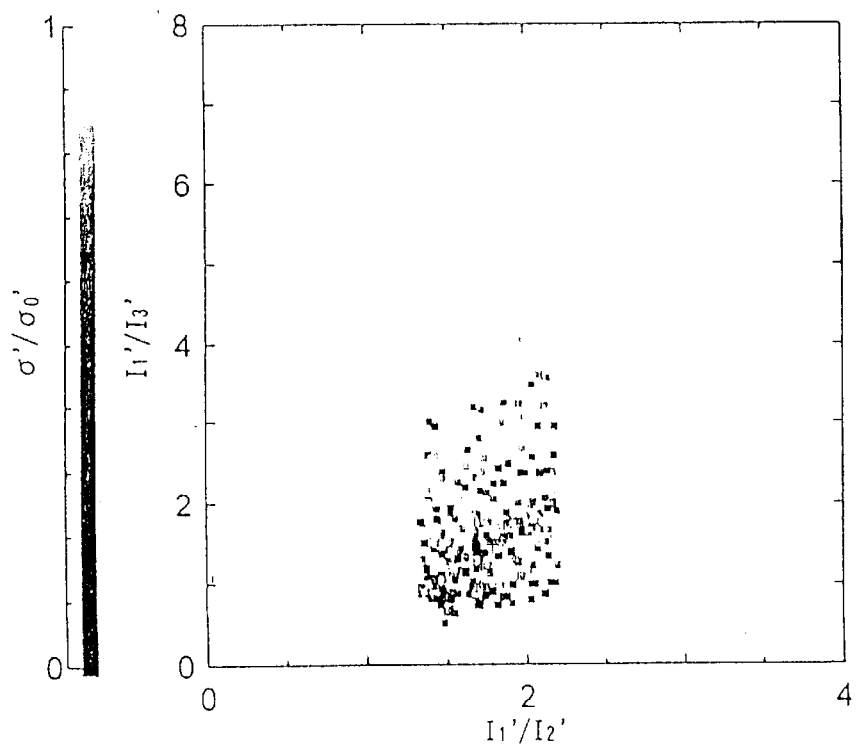
FIG. 31 is a graph showing the result of calculation for the non-dimensional maximum bending stress caused by collision between a roller and a bar portion in a cage for use in a tapered roller bearing of particularly high frequency of use.
Figure 32:
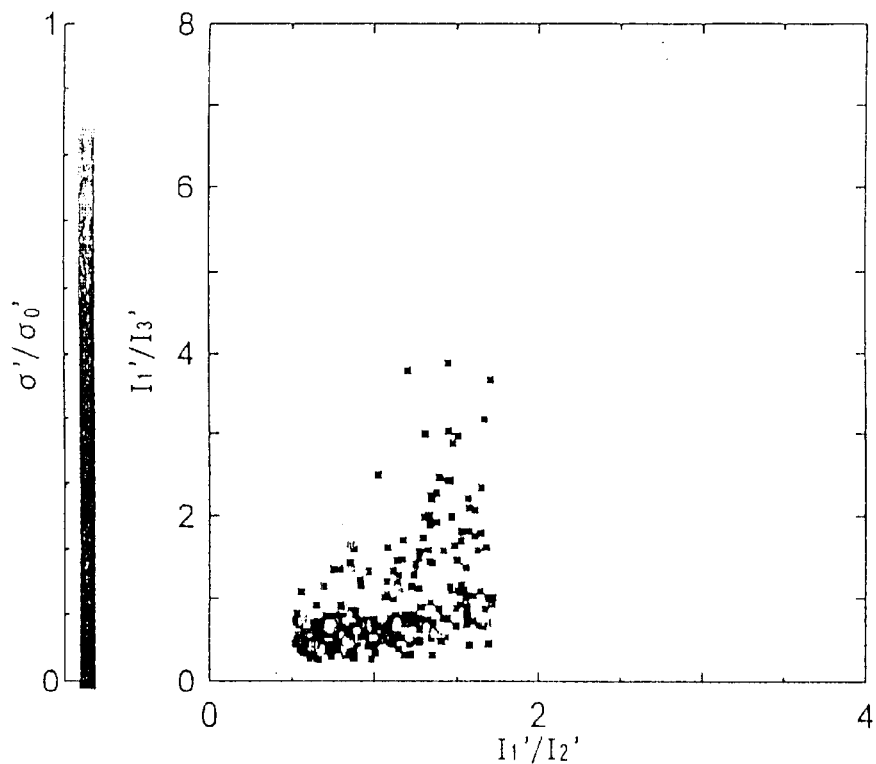
FIG. 32 is a graph showing the result of calculation for the non-dimensional maximum bending stress caused by collision between a roller and a bar portion in a cage for use in a self-aligning roller bearing according to the present invention.
Figure 33:
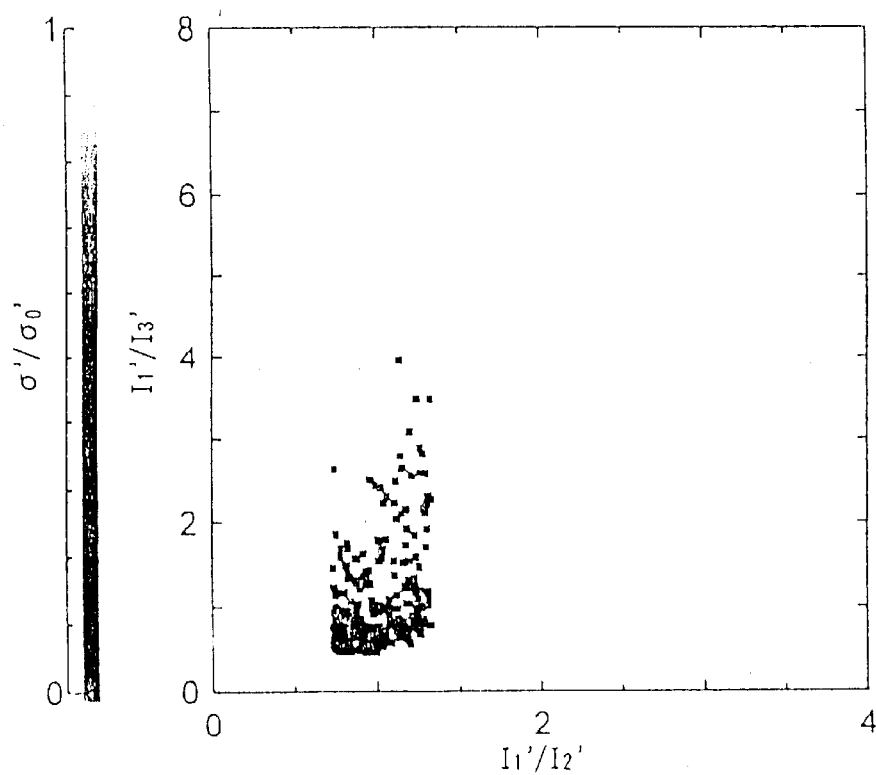
FIG. 33 is a graph showing the result of calculation for the non-dimensional maximum bending stress caused by collision between a roller and a bar portion in a cage for use in a self-aligning roller bearing of particularly high frequency of use.
Figure 34:
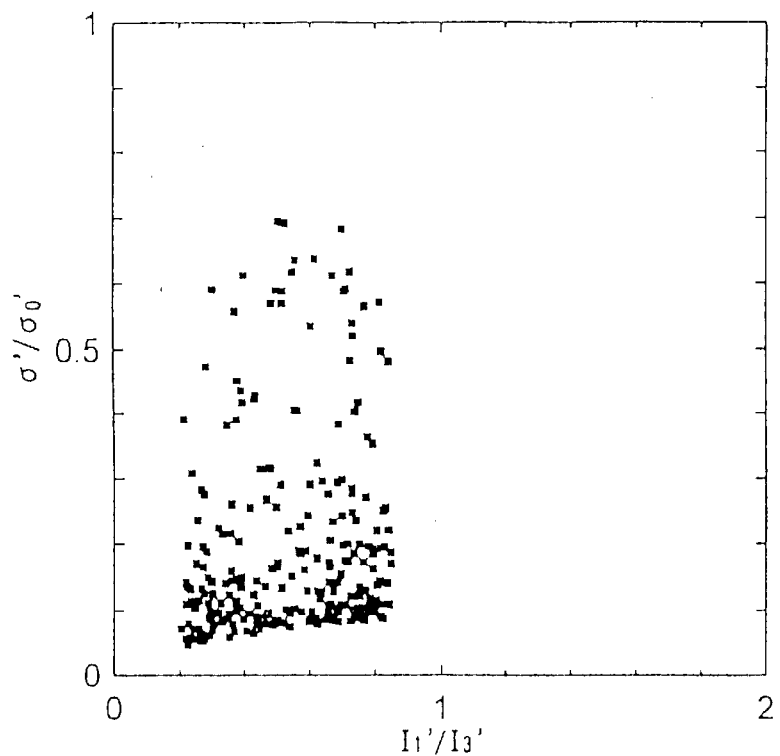
FIG. 34 is a graph showing the result of calculation for the non-dimensional maximum bending stress caused by collision between a roller and a bar portion in a cage for use in a cylindrical roller bearing according to the present invention.
Figure 35:
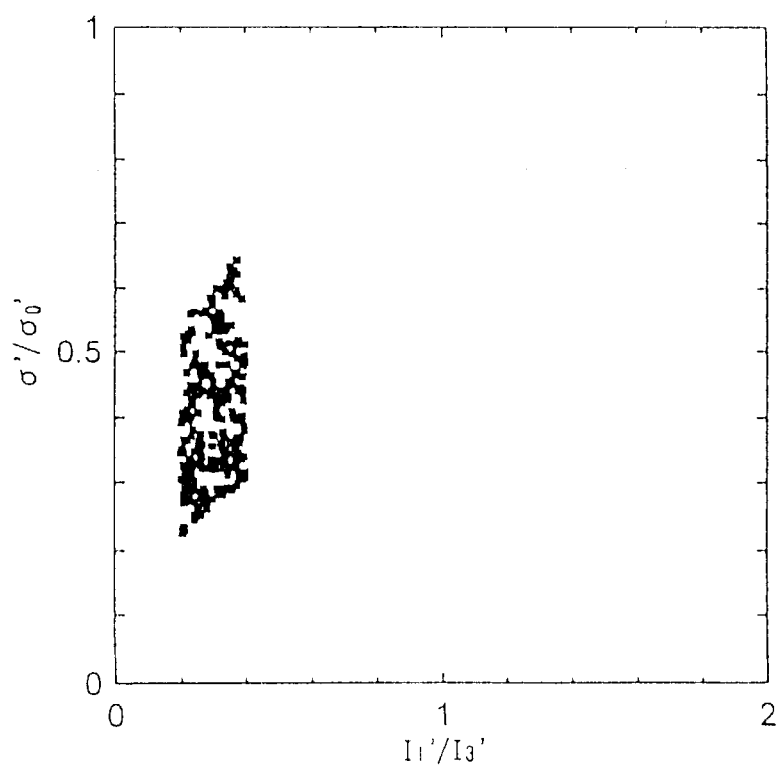
FIG. 35 is a graph showing the result of calculation for the non-dimensional maximum bending stress caused by collision between a roller and a bar portion in a cage for use in a cylindrical roller bearing of particularly high frequency of use.

The cage 4 of this embodiment is assembled in a tapered roller bearing as shown in FIG. 27.

Each cross sectional shape of circular portions 5, 6 and bar portions 7 was set such that respective moment of inertia of area $I_1'$, $I_2'$ and $I_3'$ for a pair of circular portion 5, 6 and bar portions 7 were: $0.5 \leq (I_1'/I_2') \leq 2.7$ and $0.2 \leq (I_1'/I_3') \leq 6.0$.

Thus, the strength of the cage 4 was improved without decreasing the number of pockets 8 and the volume of the space for each of the pockets 8 by so much.

That is, since the bending stress for the circular portion 5, the bending stress for the second circular portion 6 and the bending stress for the bar portion 7 were optimally designed such that they were not different greatly from each other, it was possible to prevent the fracture of the cage 4 caused by collision between the roller 3 and the bar portion 7 without lowering the load capacity of the bearing.

The first and the third embodiments are embodiments in which the strength is optimized to either one of the circumferential collision and radial collision respectively. In a case of using the cage in such a place that both of the circumferential collision and the radial collision occur repeatedly, the width and the cross sectional shape for each of the circular portions 5, 6 and the bar portion 7 may be set such that each of the moment of inertia of area $I_1$, $I_2$ and $I_3$ and $I_1'$, $I_2'$ and $I_3'$ for the pair of circular portions 5, 6 and the bar portion 7 are: $0.8 \leq (I_1'/I_2') \leq 1.4$ and $0.1 \leq (I_1'/I_3') \leq 3.0$ and $0.5 \leq (I_1'/I_2') \leq 2.7$ and $0.2 \leq (I_1'/I_3') \leq 6.0$. With such a constitution, since the bending stress for the circular portion 5, the bending stress for the second circular portion 6 and the bending stress for the bar portion 7 are designed optimally so as not to be different greatly from each other even in a case where it undergoes both of the circumferential collision and the radial collision individually or as a composite load, it is possible to prevent the fracture of the cage 4 caused by collision between the roller 3 and the bar portion 7 without lowering the load capacity of the bearing.

Then, examples related to each of the embodiments described above is to be described.

EXAMPLE 1

Figure 13:
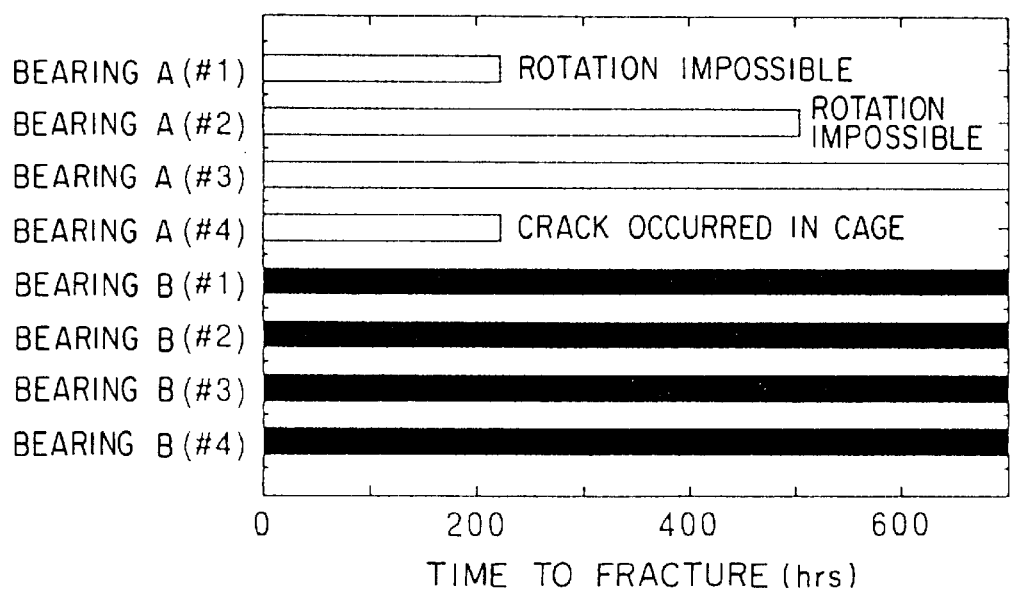
FIG. 13 is a graph showing the result of a comparative endurance test between a cage according to an example of the present invention and a cage of the prior art.

When a vibration endurance test for comparing a cage based on the present invention formed in accordance with the first embodiment with a cage of the prior art was conducted, the result shown in FIG. 13 was obtained.

The bearing used for the test was a self-aligning roller bearing 22211.

In the bearing A, a cage of the prior art was used in which $(I_1/I_2)=0.29$ and $(I_1/I_3)=0.29$.

Further, in the bearing B, the cage according to the present invention was used and a cage providing: $(I_1/I_2)=0.88$ and $(I_1/I_3)=0.50$ was used.

Further, as the conditions for the endurance test, an inner ring 2 was oscillated for 2300 cycles per minute at an angle of $\pm 15°$ while setting the radial load to 5% of the load rating.

The test was terminated at 700 hours and, as shown in FIG. 13, no fracture occurred for the cage in the bearing B, while fracture occurred for the cage in the bearing A and, accordingly, it can be seen that the present invention is suitable to prevent the cage from fracturing.

EXAMPLE 2

Figure 36:
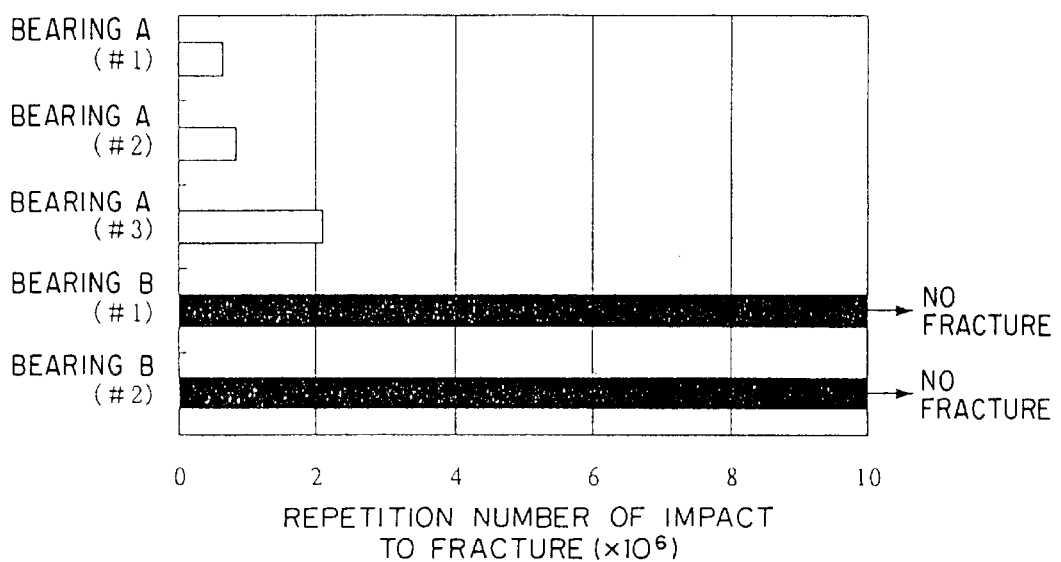
FIG. 36 is a graph showing the result of a comparative endurance test between a cage according to an example of the present invention and a cage of the prior art.

When a drop endurance test for comparing a cage based on the present invention formed in accordance with the third embodiment and a cage of the prior art was conducted, the result shown in FIG. 36 was obtained.

The bearing used for the test was a self-aligning roller bearing 22211.

In the bearing A, a cage of the prior art was used in which $(I_1'/I_2')=0.03$ and $(I_1'/I_3')=0.67$.

Further, in the bearing B, the cage according to the present invention was used and a cage providing: $(I_1'/I_2')=1.05$ and $(I_1'/I_3')=3.65$ was used.

The drop endurance test was conducted for examining the endurance of the cage by dropping the bearing together with a bearing box repeatedly and, in the experiment of FIG. 36, the falling height was set for both of the cases of the bearings A and B such that the maximum value of acceleration caused to the bearing box by dropping impact was 180 times the gravitational acceleration.

As shown in FIG. 36, the test was terminated with no fracture even after dropping for $10 \times 10^6$ cycles for the cage according to the present invention assembled in the bearing B, whereas fracture of the cage occurred at the repetitive number of dropping for $2.1 \times 10^6$ cycles or less for the bearing A. As described above, it can be seen that the present invention is suitable to the prevent the cage from fracturing.

EXAMPLE 3

Figure 23:
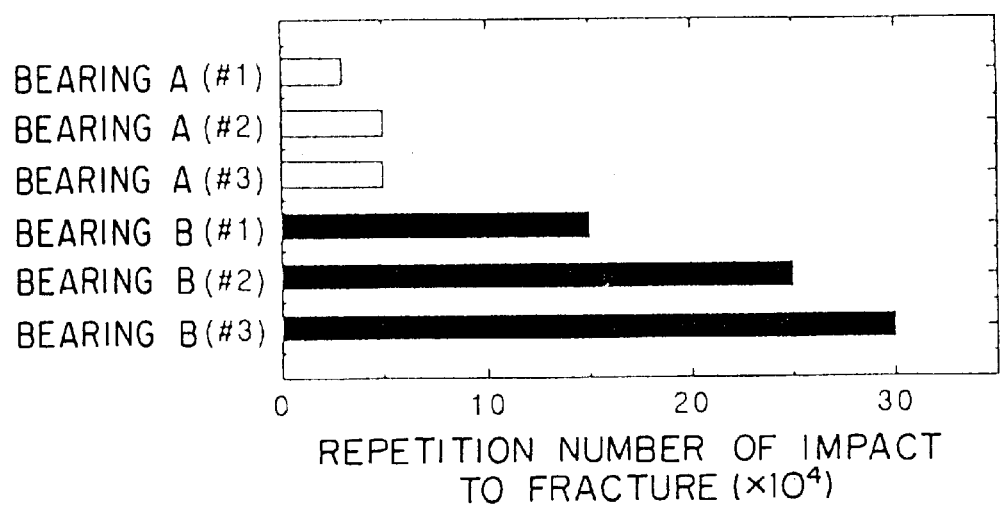
FIG. 23 is a graph showing the result of a comparative endurance test between a cage according to an example of the present invention and a cage of the prior art.

Then, when a drop impact test for comparing a comb-shaped cage according to the present invention formed in accordance with the second embodiment with a comb-shaped cage of the prior art was conducted, the result as shown in FIG. 23 was obtained.

The type of the cage is a one component type comb-shaped cage. Further, the bearing used for the test is a self-aligning roller bearing.

A cage of the prior art was used for each bearing A, in which $(I_1/I_3)=2.07$. Further, the cage for each of bearings B was manufactured according to the present invention and set to: $(I_1/I_3)=1.0$.

The drop endurance test was conducted for examining the endurance of the cage by dropping the bearing together with a bearing box repeatedly and, in the experiment of FIG. 23, the falling height was set for both of the cases of the bearings A and B such that the maximum value of acceleration caused to the bearing box by dropping impact was 150 times the gravitational acceleration.

As shown in FIG. 23, the repetitive number of impact till reaching fracture is remarkably greater for all cages according to the present invention assembled in the bearings B compared with that in the bearings A. As described above, it can be seen that the present invention is suitable to the prevent the cage from fracturing.

Figure 24:
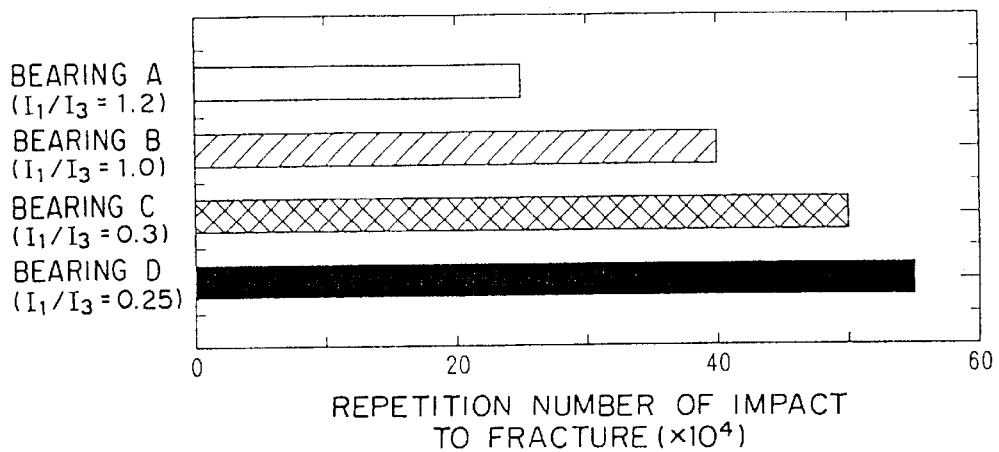
FIG. 24 is a graph showing the result of a drop impact test according to an example at the present invention.
Figure 25:
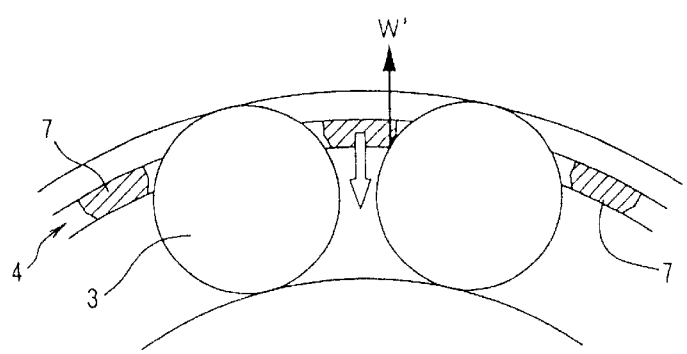
FIG. 25 is a view showing collision between a roller and a bar portion in a tapered roller bearing.
Figure 26A:
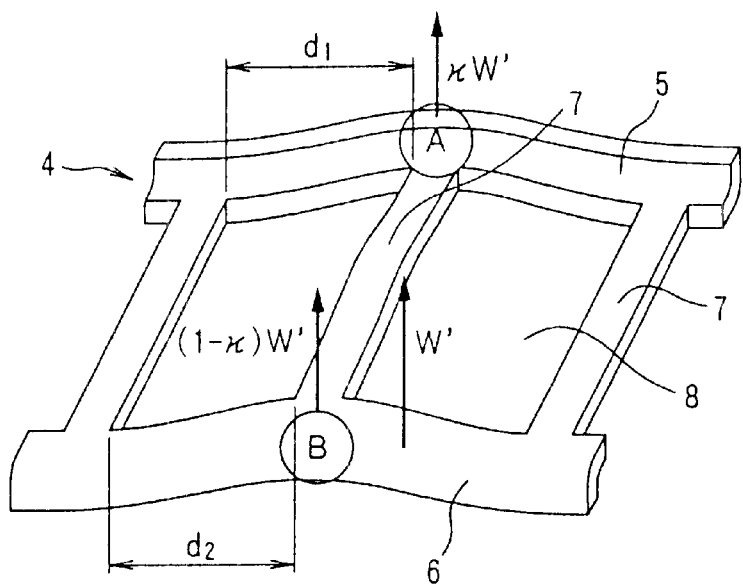
FIG. 26 is a schematic view showing the deformation of a cage by collision between a roller and a bar portion in a cage for use in a tapered roller bearing.
Figure 26B:
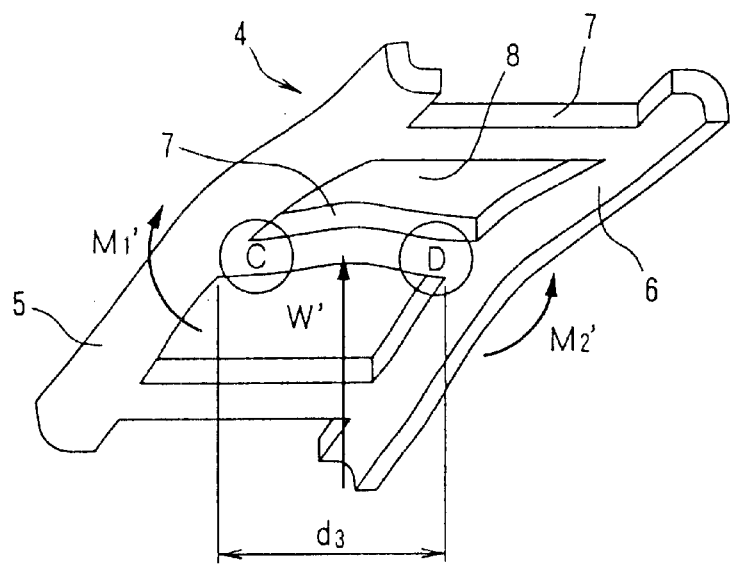

Further, a drop impact test was conducted under the same conditions as described above while changing $(I_1/I_3)$. The result is shown in FIG. 24. The type of the cage used was a two component type comb-shaped cage.

The bearings used for the test were self-aligning roller bearings of the same conditions except for the cages, which were manufactured while changing the value $(I_1/I_3)$ of the cages assembled in the bearings as shown in FIG. 24. The result shown in FIG. 24 is the mean value for the test conducted three times for each of bearings assembled within cages having an identical value $(I_1/I_3)$.

In this case, the values $(e_1/e_3)$ and $(d_1/d_3)$ are set such that $(\sigma/\sigma_0)$ takes a minimum value for each $(I_1/I_3)$.

As can be seen from FIG. 24, as the value $(I_1/I_3)$ is smaller, fracture of the cage less occurs.

Figure 18:
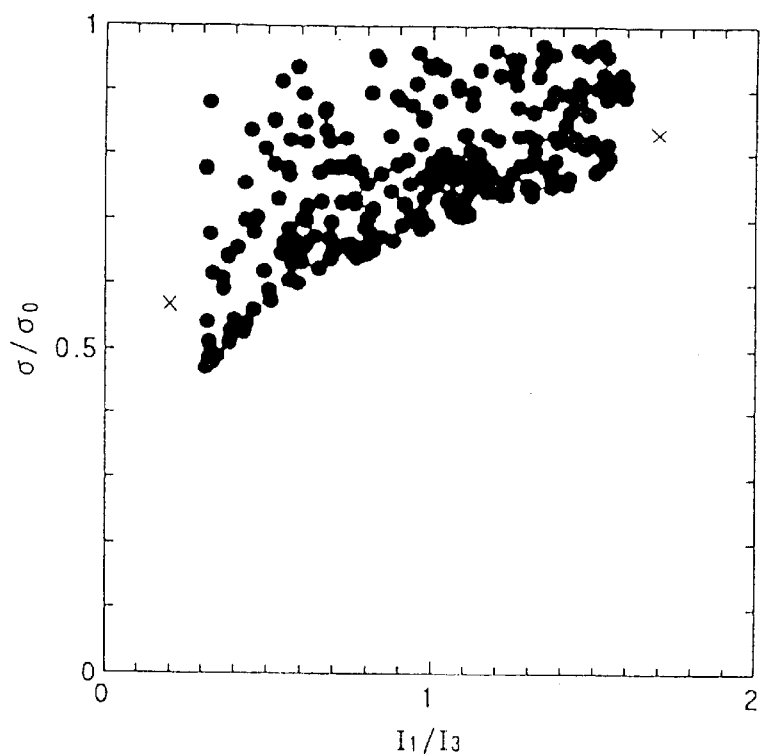
FIG. 18 is a graph showing the result of calculation for the non-dimensional maximum bending stress caused by collision between a roller and a bar portion in a cage for use in a roller bearing according to the present invention.
Figure 19:
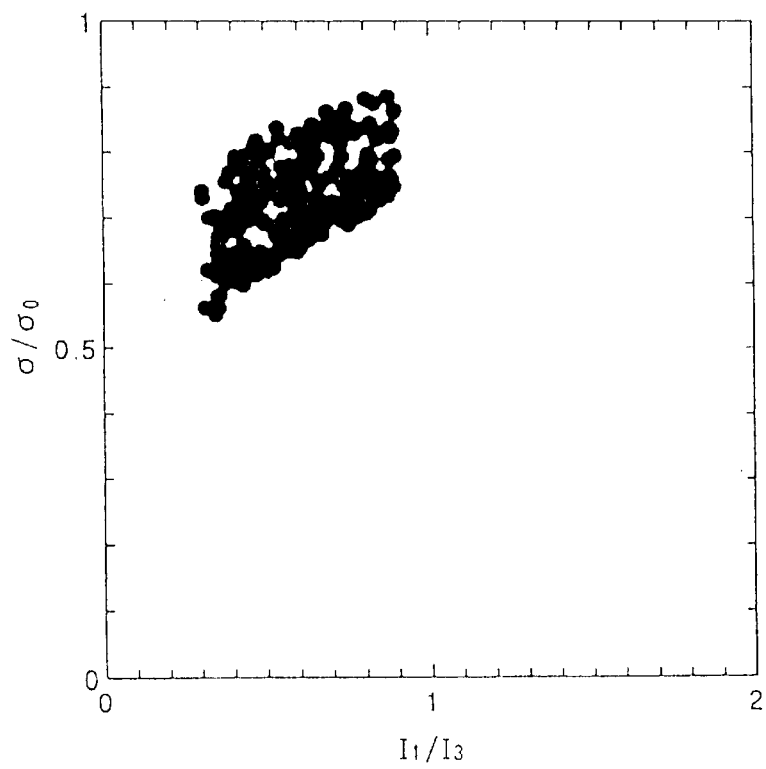
FIG. 19 is a graph showing the result of calculation for the non-dimensional maximum bending stress caused by collision between a roller and a bar portion in a two component type cage for use in a double row cylindrical roller bearing according to the present invention.
Figure 20:
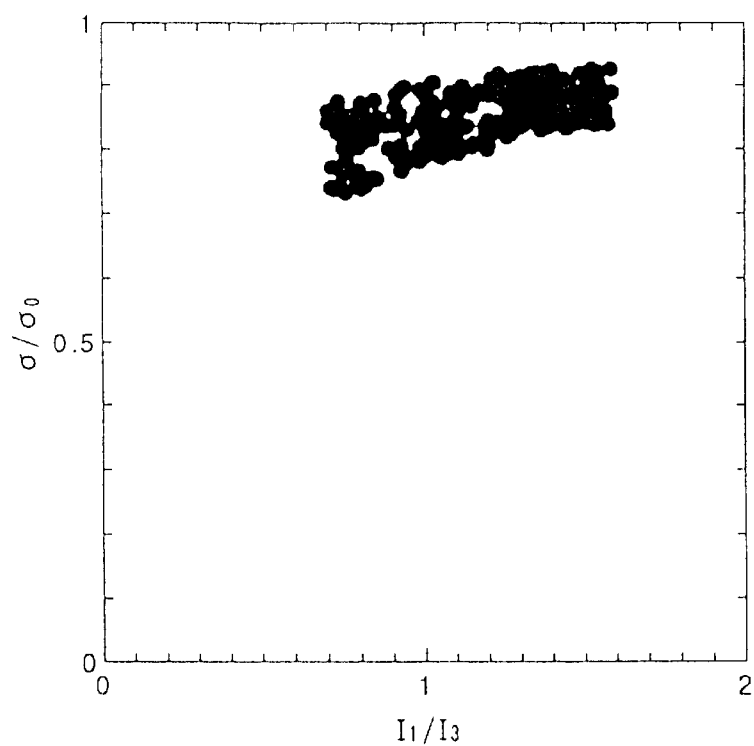
FIG. 20 is a graph showing the result of calculation for the non-dimensional maximum bending stress caused by collision between a roller and a bar portion in a one component type cage for use in a double row cylindrical roller bearing according to the present invention.
Figure 21:
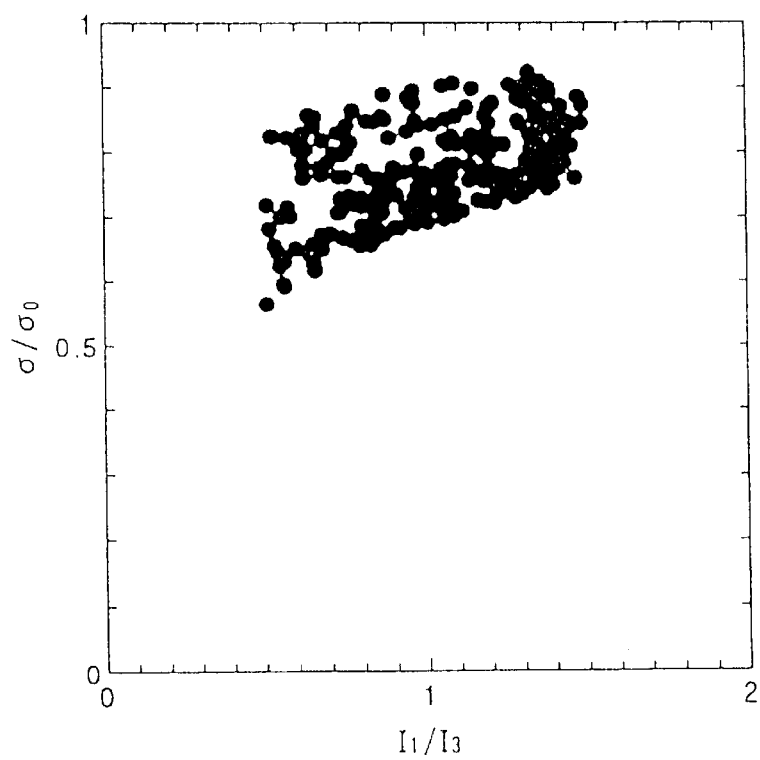
FIG. 21 is a graph showing the result of calculation for the non-dimensional maximum bending stress caused by collision between a roller and a bar portion in a two component type cage for use in a self-aligning roller bearing according to the present invention.
Figure 22:
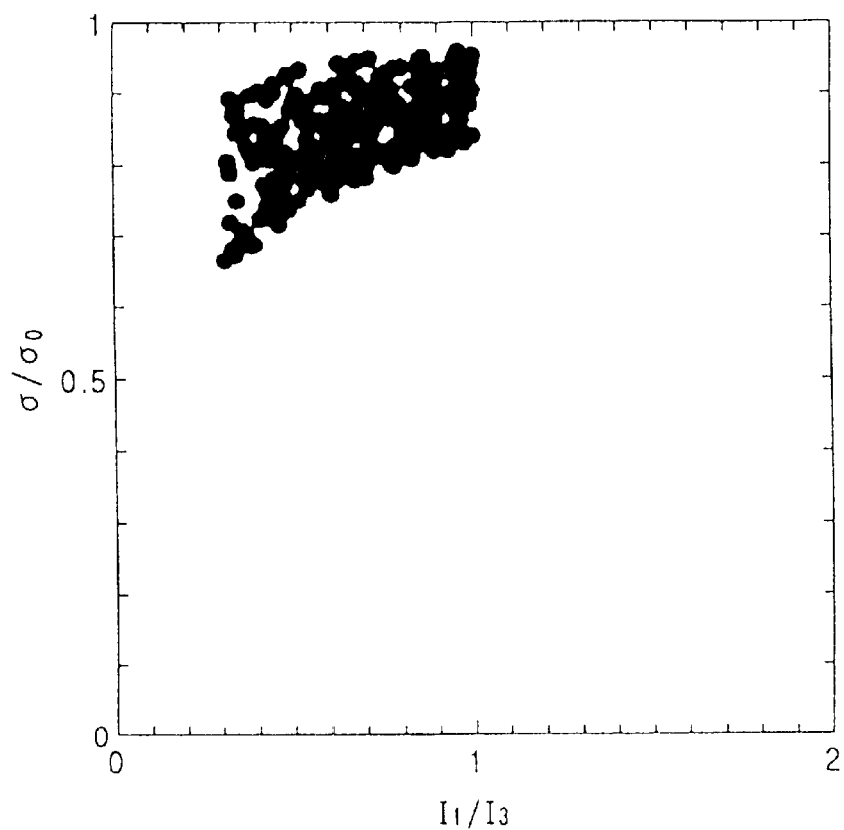
FIG. 22 is a graph showing the result of calculation for the non-dimensional maximum bending stress caused by collision between a roller and a bar portion in a one component type cage for use in a self-aligning roller bearing according to the present invention.

In this case, $(I_1/I_3)$ of the cage for the bearings D is beyond the scope of the present invention and they are those indicated by the symbol X in FIG. 18, that is, cages having defect in view of the dimensional design. That is, they are bearings of lowered load capacity or having defect for the space saving of the bearing in view of the design. That is, if $(I_1/I_3)$ is 0.3 or smaller, it results in: (moment of inertia of area $I_3$ for bar portion)>>(moment of inertia of area $I_1$ for circular portion), which corresponds to setting of the axial width of the circular portion smaller and the circumferential width of the bar portion larger. This decreases the diameter of a roller to be held smaller when the rollers are incorporated by the identical number and the load capacity can not be increased unless the length of the roller is increased, making it inevitable to lower the load capacity of the bearing or increase the width of the bearing, that is, the size of the bearing itself has to be enlarged to impose a restriction on the design.

On the other hand, as can be seen from FIG. 18 to FIG. 22, as the value $(I_1/I_3)$ is greater, the minimum value of $(\sigma/\sigma_0)$ that can be actually adopted is enlarged to result in an apparent disadvantage and reduce the impact durability.

Accordingly, it is desirable to keep the value $(I_1/I_3)$ as small as possible depending on the conditions to be used. However, it is necessary to make the value $(I_1/I_3)$ to 0.3 or greater in view of the load capacity and the size enlargement of the bearing required actually as described above.

Industrial Applicability

As has been described above, when the invention according to any one of claim 1 to claim 10 is adopted, it can provide effects capable of attaining an optimal design such that the bending stress for the circular portion, the bending stress for the second circular portion and the bending stress for the bar portion are not different greatly from each other, while considering the direction of the load applied from the roller to the cage and preventing the fracture of the cage caused by collision between the roller and the bar portion without lowering the load capacity of the bearing.

Particularly, a more optimal design is possible as a cage for use in a tapered roller bearing by adopting the invention according to claim 2 or claim 5, particularly, the invention according to claim 8.

Further, a more optimal design is possible as a cage for use in a self-aligning roller bearing by adopting the invention according to claim 3 or claim 6, particularly, the invention according to claim 9.

Further, a more optimal design is possible as a cage for use in a cylindrical roller bearing by adopting the invention according to claim 4 or claim 7, particularly, the invention according to claim 10.

Further, when the invention according to any one of claims 11 to 15 is adopted, this can provide effects capable of attaining the optimal design such that the bending stress for the circular portion and the bending stress for the bar portion are not different greatly from each other even in a comb-shaped cage and preventing the fracture of the cage caused by collision between the roller and the bar portion without lowering the load capacity of the bearing.

Particularly, a further optimal design is possible as a cage adopted for a two component type double row cylindrical roller bearing by adopting the invention according to claim 12.

Particularly, a further optimal design is possible as a cage adopted for a one component type double row cylindrical roller bearing by adopting the invention according to claim 13.

Further, a more optimal design is possible as a cage adopted for a two component type self-aligning roller bearing by adopting the invention according to claim 14.

Further, a more optimal design is possible as a cage adopted for a one component self-aligning roller bearing by adopting the invention according to claim 15.

What is claimed is:

1. A cage for use in a roller bearing having a plurality of bar portions arranged circumferentially while opposed to the rolling contact surface of each of rollers and a pair of circular portions axially opposed to an end surface of each of the rollers and connecting both axial ends of the bar portions arranged in the circumferential direction, respectively, which satisfies the conditional equation:

$$0.8 \leq (I_1/I_2) \leq 1.4,$$

and $$0.1 \leq (I_1/I_3) \leq 3.0$$

or the conditional equation:

$$0.5 \leq (I_1'/I_2') \leq 2.7$$

and $$0.2 \leq (I_1'/I_3') \leq 6.0,$$

wherein one circular portion having a larger or equal diameter, in the pair of the circular portions, is referred to as a first circular portion, the other circular portion having a smaller or identical diameter is referred to as a second circular portion, the moment of inertia of area for the first circular portion relative to a neutral axis vertical to the longitudinal direction of the bar portion is $I_1$, the moment of inertia of area for the second circular portion relative to a neutral axis vertical to the longitudinal direction of the bar portion is $I_2$, the moment of inertia of area for the bar portion relative to a neutral axis vertical to the circumferential direction of the cage is $I_3$, the moment of inertia of area for the circular portion relative to a neutral axis parallel with the longitudinal direction of the bar portion is $I_1'$, the moment of inertia of area for the second circular portion relative to a neutral axis parallel with the longitudinal direction of the bar portion is $I_2'$, and the moment of inertia of area for the bar portion relative to a neutral axis parallel with the circumferential direction of the cage is $I_3'$.

2. A cage for use in a roller bearing assembled in a tapered roller bearing having a plurality of bar portions arranged circumferentially while opposed to the rolling contact surface of each of rollers and a pair of circular portions axially opposed to an end surface of each of the rollers and connecting both axial ends of the bar portions arranged in the circumferential direction, respectively, and the diameter being different between the pair of circular portions, which satisfies at least one of the following conditional equations:

the conditional equation:

$$1.0 \leq (I_1/I_2) \leq 1.4,$$

and $$0.1 \leq (I_1/I_3) \leq 3.0$$

or the conditional equation:

$$1.0 \leq (I_1'/I_2') \leq 2.7$$

and $$0.2 \leq (I_1'/I_3') \leq 6.0,$$

wherein one circular portion having a larger diameter, in the pair of the circular portions, is referred to as a first circular portion, the other circular portion having a smaller diameter is referred to as a second circular portion, the moment of inertia of area for the first circular portion relative to a neutral axis vertical to the longitudinal direction of the bar portion is $I_1$, the moment of inertia of area for the second circular portion relative to a neutral axis vertical to the longitudinal direction of the bar portion is $I_2$, the moment of inertia of area for the bar portion relative to a neutral axis vertical to the circumferential direction of the cage is $I_3$, the moment of inertia of area for the circular portion relative to a neutral axis parallel with the longitudinal direction of the bar portion is $I_1'$, the moment of inertia of area for the second circular portion relative to a neutral axis parallel with the longitudinal direction of the bar portion is $I_2'$, and the moment of inertia of area for the bar portion relative to a neutral axis parallel with the circumferential direction of the cage is $I_3'$.

3. A cage for use in a roller bearing as defined in claim 2, wherein the conditions:

$$1.0 \leq (I_1/I_2) \leq 1.2$$

and $$0.1 \leq (I_1/I_3) \leq 0.6$$

are satisfied.

4. A cage for use in a roller bearing as defined in claim 2, wherein the conditions:

$$1.3 \leq (I_1'/I_2') \leq 2.2$$

and $$0.8 \leq (I_1'/I_3') \leq 4.0$$

are satisfied.

5. A cage for use in a roller bearing as defined in claim 2, wherein the conditions:

$$1.0 < (I_1/I_2) \leq 1.4$$

$$0.1 \leq (I_1/I_3) \leq 3.0$$

$$1.0 < (I_1'/I_2') \leq 2.7$$

and $$0.2 \leq (I_1'/I_3') \leq 6.0$$

are satisfied.

6. A cage for use in a roller bearing as defined in claim 5, wherein the conditions:

$$1.0 \leq (I_1/I_2) \leq 1.2$$

$$0.1 \leq (I_1/I_3) \leq 0.6$$

$$1.3 \leq (I_1'/I_2') \leq 2.2$$

and $$0.8 \leq (I_1'/I_3') \leq 4.0$$

are satisfied.

7. A cage for use in a roller bearing assembled in a self-aligning roller bearing having a plurality of bar portions arranged circumferentially while opposed to the rolling contact surface of each of rollers and a pair of circular portions axially opposed to an end surface of each of the rollers and connecting both axial ends of the bar portions arranged in the circumferential direction, respectively, which satisfies at least one of the following conditional equations:

the conditional equation:

$$0.8 \leq (I_1/I_2) \leq 1.2,$$

and $$0.3 \leq (I_1/I_3) \leq 3.0$$

or the conditional equation:

$$0.5 \leq (I_1'/I_2') \leq 1.7$$

and $$0.2 \leq (I_1'/I_3') \leq 4.0,$$

wherein one circular portion having a larger or equal diameter, in the pair of the circular portions, is referred to as a first circular portion, the other circular portion having a smaller or identical diameter is referred to as a second circular portion, the moment of inertia of area for the first circular portion relative to a neutral axis vertical to the longitudinal direction of the bar portion is $I_1$, the moment of inertia of area for the second circular portion relative to a neutral axis vertical to the longitudinal direction of the bar portion is $I_2$, the moment of inertia of area for the bar portion relative to a neutral axis vertical to the circumferential direction of the cage is $I_3$ the moment of inertia of area for the circular portion relative to a neutral axis parallel with the longitudinal direction of the bar portion is $I_1'$, the moment of inertia of area for the second circular portion relative to a neutral axis parallel with the longitudinal direction of the bar portion is $I_2'$, and the moment of inertia of area for the bar portion relative to a neutral axis parallel with the circumferential direction of the cage is $I_3'$.

8. A cage for use in a roller bearing as defined in claim 7, in which the diameter of the first circular portion is larger than one of the second circular portion.

9. A cage for use in a roller bearing as defined in claim 7, wherein the conditions:

$$0.9 \leq (I_1/I_2) \leq 1.1$$

and $$0.3 \leq (I_1/I_3) \leq 0.6$$

are satisfied.

10. A cage for use in a roller bearing as defined in claim 7, wherein the conditions:

$$0.8 \leq (I_1'/I_2') \leq 1.3$$

and $$0.5 \leq (I_1'/I_3') \leq 4.0$$

are satisfied.

11. A cage for use in a roller bearing as defined in claim 7, wherein the conditions:

$$0.8 \leq (I_1/I_2) \leq 1.2$$

$$0.3 \leq (I_1/I_3) \leq 3.0$$

$$0.5 \leq (I_1'/I_2') \leq 1.7$$

and $$0.2 \leq (I_1'/I_3') \leq 4.0$$

are satisfied.

12. A cage for use in a roller bearing as defined in 11, wherein the conditions:

$$0.9 \leq (I_1/I_2) \leq 1.1$$

$$0.3 \leq (I_1/I_3) \leq 0.6$$

$$0.8 \leq (I_1'/I_2') \leq 1.3$$

and $$0.5 \leq (I_1'/I_3') \leq 4.0$$

are satisfied.

13. A cage for use in a roller bearing assembled in a cylindrical roller bearing having a plurality of bar portions arranged circumferentially while opposed to the rolling contact surface of each of rollers and a pair of circular portions axially opposed to an end surface of each of the rollers and connecting both axial ends of the bar portions arranged in the circumferential direction, respectively, and the diameter being equal or nearly equal between the pair of the circular portions, which satisfies at least one of the following conditional equations:

the conditional equation:

$$(I_1/I_2) \approx 1$$

and $$0.1 \leq (I_1/I_3) \leq 0.4$$

or the conditional equation:

$$(I_1/I_2) \approx 1$$

and $$0.2 \leq (I_1'/I_3') \leq 0.8$$

wherein one circular portion, in the pair of the circular portions, is referred to as a first circular portion, the other circular portion is referred to as a second circular portion, that the moment of inertia of area for the first circular portion relative to a neutral axis vertical to the longitudinal direction of the bar portion is $I_1$, the moment of inertia of area for the second circular portion relative to a neutral axis vertical to the longitudinal direction of the bar portion is $I_2$, the moment of inertia of area for the bar portion relative to a neutral axis vertical to the circumferential direction of the cage is $I_3$, the moment of inertia of area for the circular portion relative to a neutral axis parallel with the longitudinal direction of the bar portion is $I_1'$, the moment of inertia of area for the second circular portion relative to a neutral axis parallel with the longitudinal direction of the bar portion is $I_2'$, and the moment of inertia of area for the bar portion relative to a neutral axis parallel with the circumferential direction of the cage is $I_3'$.

14. A cage for use in a roller bearing as defined in claim 13, wherein the conditions:

$$(I_1'/I_2') \approx 1$$

and $$0.2 \leq (I_1'/I_3') \leq 0.4$$

are satisfied.

15. A cage for use in a roller bearing as defined in claim 13, wherein the conditions:

$$(I_1/I_2) \approx 1$$

$$0.1 \leq (I_1/I_3) \leq 0.4$$

$$(I_1'/I_2') \approx 1$$

and $$0.2 \leq (I_1'/I_3') \leq 0.8$$

are satisfied.

16. A cage for use in a roller bearing as defined in claim 15, wherein the conditions:

$$(I_1/I_2) \approx 1$$

$$0.1 \leq (I_1/I_3) \leq 0.4$$

$$(I_1'/I_2') \approx 1$$

and $$0.2 \leq (I_1'/I_3') \leq 0.4$$

are satisfied.

17. A comb-shaped cage for use in a roller bearing having one circular portion axially opposed to an end surface of each of rollers and a plurality of bar portions protruding from one or both axial sides of the circular portion and arranged circumferentially while opposed to the rolling contact surface for each of the rollers, which satisfies the condition: $0.3 \leq (I_1/I_3) \leq 1.6$, wherein the moment of inertia of area for the circular portion relative to a neutral axis vertical to the longitudinal direction of the bar portion is $I_1$ and the moment of inertia of area for the bar portion relative to a neutral axis vertical to the circumferential direction of the cage is $I_3$.

18. A comb-shaped cage for use in a roller bearing assembled into a double row cylindrical roller bearing having one circular portion axially opposed to an end surface of each of rollers and a plurality of bar portions protruding from only one axial side of the circular portion and arranged circumferentially while opposed to the rolling contact surface for each of the rollers, which satisfies the condition: $0.3 \leq (I_1/I_3) \leq 0.9$, wherein the moment of inertia of area for the circular portion relative to a neutral axis vertical to the longitudinal direction of the bar portion is $I_1$ and the moment of inertia of area for the bar portion relative to a neutral axis vertical to the circumferential direction of the cage is $I_3$.

19. A comb-shaped cage for use in a roller bearing assembled into a double row cylindrical roller bearing having one circular portion axially opposed to an end surface of each of rollers and a plurality of bar portions protruding from both axial sides of the circular portion and arranged circumferentially while opposed to the rolling contact surface for each of the rollers, which satisfies the condition: $0.7 \leq (I_1/I_3) \leq 1.6$, wherein the moment of inertia of area for the circular portion relative to a neutral axis vertical to the longitudinal direction of the bar portion is $I_1$ and the moment of inertia of area for the bar portion relative to a neutral axis vertical to the circumferential direction of the cage is $I_3$.

20. A comb-shaped cage for use in a roller bearing assembled into a self-aligning roller bearing having one circular portion axially opposed to an end surface of each of rollers and a plurality of bar portions protruding from only one axial side of the circular portion and arranged circumferentially while opposed to the rolling contact surface for each of the rollers, which satisfies the condition: $0.5 \leq (I_1/I_3) \leq 1.5$, wherein the moment of inertia of area for the circular portion relative to a neutral axis vertical to the longitudinal direction of the bar portion is $I_1$ and the moment of inertia of area for the bar portion relative to a neutral axis vertical to the circumferential direction of the cage is $I_3$.

21. A comb-shaped cage for use in a roller bearing assembled into a self-aligning roller bearing having one circular portion axially opposed to an end surface of each of rollers and a plurality of bar portions protruding from both axial sides of the circular portion and arranged circumferentially while opposed to the rolling contact surface for each of the rollers, which satisfies the condition: $0.3 \leq (I_1/I_3) \leq 1.0$, wherein the moment of inertia of area for the circular portion relative to a neutral axis vertical to the longitudinal direction of the bar portion is $I_1$ and the moment of inertia of area for the bar portion relative to a neutral axis vertical to the circumferential direction of the cage is $I_3$.

* * * * *